United States Patent
Zöller

(10) Patent No.: US 10,865,125 B2
(45) Date of Patent: Dec. 15, 2020

(54) LIQUID TREATMENT CARTRIDGE, SET OF SUCH CARTRIDGES AND METHOD OF MANUFACTURING IT

(71) Applicant: BRITA GmbH, Taunusstein (DE)

(72) Inventor: Jochen Zöller, Nastätten (DE)

(73) Assignee: BRITA GMBH, Taunusstein (DE)

( * ) Notice: Subject to any disclaimer, the term of this patent is extended or adjusted under 35 U.S.C. 154(b) by 1 day.

(21) Appl. No.: 15/541,685

(22) PCT Filed: Jan. 7, 2015

(86) PCT No.: PCT/EP2015/050155
§ 371 (c)(1),
(2) Date: Jul. 5, 2017

(87) PCT Pub. No.: WO2016/110321
PCT Pub. Date: Jul. 14, 2016

(65) Prior Publication Data
US 2018/0016161 A1    Jan. 18, 2018

(51) Int. Cl.
*C02F 1/28* (2006.01)
*B01D 35/30* (2006.01)
(Continued)

(52) U.S. Cl.
CPC .............. *C02F 1/28* (2013.01); *B01D 35/301* (2013.01); *C02F 1/42* (2013.01); *C02F 1/44* (2013.01);
(Continued)

(58) Field of Classification Search
None
See application file for complete search history.

(56) References Cited

U.S. PATENT DOCUMENTS

| 7,524,047 B2 | 4/2009 | Silverbrook | |
| 2002/0020662 A1* | 2/2002 | Gottwarld-Grill | B01D 29/21 |
| | | | 210/440 |

(Continued)

FOREIGN PATENT DOCUMENTS

| JP | 39-001886 B1 | 2/1964 |
| JP | H 10-216707 A | 8/1998 |

(Continued)

OTHER PUBLICATIONS

International Preliminary Report on Patentability as received in PCT/EP2015/050155 dated Jul. 11, 2017.

*Primary Examiner* — Ana M Fortuna
(74) *Attorney, Agent, or Firm* — Keller Jolley Preece

(57) ABSTRACT

A liquid treatment cartridge includes a housing, the housing including a housing part forming an axial end of the housing and including a connecting head at the axial end of the housing. The connecting head includes at least three liquid ports, each at an end of a respective channel defined by the housing part. The connecting head is configured for insertion into a head part of a liquid treatment system such that the liquid ports of the connecting head are in sealed liquid communication with respective liquid ports in the head part. The liquid treatment cartridge includes at least one separate flow conductor part on the inside of the housing, attached to the housing part and including at least one conduit for conducting liquid so as to separate interior ends of at least two of the channels from those of at least one other of the channels.

38 Claims, 20 Drawing Sheets

(51) Int. Cl.
*C02F 1/42* (2006.01)
*C02F 1/44* (2006.01)
*C02F 1/00* (2006.01)

(52) U.S. Cl.
CPC ........ *B01D 2201/302* (2013.01); *C02F 1/006* (2013.01); *C02F 2201/004* (2013.01); *C02F 2201/006* (2013.01)

(56) References Cited

U.S. PATENT DOCUMENTS

| | | | |
|---|---|---|---|
| 2002/0043491 A1* | 4/2002 | Janik | B01D 27/06 210/249 |
| 2002/0108875 A1* | 8/2002 | Feinberg | A61B 17/00491 206/364 |
| 2003/0173286 A1 | 9/2003 | Evanovich et al. | |
| 2012/0145625 A1* | 6/2012 | Schiavon | B01D 29/21 210/420 |
| 2013/0206680 A1* | 8/2013 | Moore | B01D 29/21 210/440 |
| 2015/0265953 A1* | 9/2015 | Morris | B01D 29/21 210/136 |

FOREIGN PATENT DOCUMENTS

| | | |
|---|---|---|
| JP | 2000-513656 A | 10/2000 |
| JP | 2003-071436 A | 3/2003 |
| JP | 2009-532199 A | 9/2009 |
| JP | 2011-501696 A | 1/2011 |
| RU | 2 137 553 C1 | 9/1999 |
| TW | 496753 B | 8/2002 |
| TW | I 405603 B1 | 8/2013 |
| TW | M487092 U | 10/2014 |
| WO | 2003/076044 A1 | 9/2003 |
| WO | 2005/063358 A2 | 7/2005 |
| WO | 2007/002893 A2 | 1/2007 |
| WO | WO 2008/098952 A1 | 8/2008 |

* cited by examiner

LIQUID TREATMENT CARTRIDGE, SET OF SUCH CARTRIDGES AND METHOD OF MANUFACTURING IT

CROSS-REFERENCE TO RELATED APPLICATIONS

This application is a national phase entry under 35 U.S.C. § 371 of International Application No. PCT/EP2015/050155, filed Jan. 7, 2015. The entire contents of the foregoing patent application are hereby incorporated by reference.

SUMMARY

The invention relates to a liquid treatment cartridge including:
  a housing, the housing including a housing part forming an axial end of the housing and including a connecting head at the axial end of the housing,
  wherein the connecting head includes at least three liquid ports, each at an end of a respective channel defined by the housing part,
  wherein the connecting head is configured for insertion into a head part of a liquid treatment system such that the liquid ports of the connecting head are in sealed liquid communication with respective liquid ports in the head part; and
  at least one separate flow conductor part on the inside of the housing, attached to the housing part and including at least one conduit for conducting liquid so as to separate interior ends of at least two of the channels from those of at least one other of the channels.

The invention also relates to a liquid treatment cartridge, e.g. of the aforementioned type, including a housing, the housing including a housing part forming an axial end of the housing and including a connecting head at the axial end of the housing,
  wherein the connecting head includes at least one liquid port and is configured for insertion into a head part of a liquid treatment system such that the liquid port(s) of the connecting head are in sealed liquid communication with respective liquid ports in the head part,
  wherein the connecting head is insertable in axial direction into a cavity of a receiving part of the head part movably journalled with respect to a housing of the head part, and
  wherein the connecting head includes at least one alignment part for axially aligning the receiving part with the liquid treatment cartridge during insertion of the connecting head into the cavity,
  the alignment part being provided on an external surface of the connecting head for insertion into a groove of the receiving part when the connecting head is inserted into the cavity.

The invention also relates to a set of liquid treatment cartridges, each of the type defined above in the opening paragraph.

The invention also relates to a method of manufacturing at least one of range of liquid treatment cartridges, each of the type defined above in the opening paragraph.

The invention also relates to a liquid treatment system.

US 2010/0116729 A1 discloses a device for treating water, particularly a filtration device, comprising a cartridge, which has a receptacle for receiving treatment agents for water and a connecting head arranged on the receptacle. The connecting head has at least one inlet opening and at least one outlet opening. The device comprises a holder for the connecting head with at least one inflow opening and at least one outflow opening, which are connected to the inlet and outlet openings of the connecting head in a sealing manner by means of sealing elements. In an embodiment, the connecting head has four side surfaces and one end surface. A side surface is formed by a first outer surface section which has three openings. There are a first and a second water inlet opening in order to conduct two partial streams into the interior of the cartridge. Two inlet openings are needed if a diluting mechanism is arranged in the holder element or upstream of the holder element. The partial streams so introduced are subjected to different treatment inside the filtration cartridge and then merged together. The treated water is taken out of the cartridge via the water outlet opening.

A cartridge of this general type is currently sold by the applicant under the name Purity C. It differs primarily in that the inlet openings are provided on an opposite surface section to that on which the outlet opening is provided. A fall tube is plugged into the connecting head to conduct one of the partial streams to the opposite end of the interior of the housing. A concentric part is plugged into the connecting head to conduct the second of the partial streams to a location about midway along the longitudinal axis of the housing.

It would be possible to provide a different interior part with a fall tube for plugging into the connecting head, such that the partial streams are mixed in the fall tube before treatment. This would be desirable, for example if no diluting mechanism were to be provided and one wanted to use the same connecting head in a cartridge in which all the water is subjected to the same treatment without closing off one of the inlet openings. However, the throughput would be limited by the single outlet opening. Thus, one could not use the same connecting head to implement e.g. a high-throughput cartridge. Making the single outlet opening much larger than an individual inlet opening would mean either giving it an elongate cross-sectional shape or increasing the diameter of the connecting head.

It is a first object of the invention to provide a liquid treatment cartridge of the type mentioned above in the opening paragraph, a set of such cartridges, a method of manufacturing at least one of a range of such cartridges and a liquid treatment system including at least one such cartridge, with a housing part including the connecting head that allows the cartridge to be configured to implement a range of cartridge types covering a relatively wide range of applications by attaching appropriate interior parts to the housing part.

WO 2005/077490 A1 discloses a filter cartridge and manifold system including a filter cartridge having a head equipped with a pair of laterally opposed cam lugs or cam pins, in combination with a pair of inlet and outlet ports having cartridge check valves installed therein. The cartridge inlet and outlet ports extend axially upwardly in parallel spaced relation from the cartridge head. The cartridge inlet and outlet ports are oriented for slide-fit, push-on coupling with a corresponding pair of inlet and outlet fittings, which protrude radially outwardly in parallel spaced relation from a tubular valve body. The tubular valve body is movably mounted on a modified support bracket for rotary movement with a modified manifold cap as the filter cartridge is installed or removed for replacement. The support bracket includes a lower pair of forwardly projecting bracket arms defining a forwardly open pair of generally horizontally oriented cam slots or tracks. The manifold cap is rotatably mounted on the support bracket, and the tubular valve body is carried by the manifold cap for rotation therewith. An inner cap shell carried by the manifold cap additionally defines a downwardly open, generally oval-shaped passage having the radially projecting manifold inlet and outlet fittings positioned therein and adapted further for slide-fit reception of the upwardly projecting inlet and outlet ports on the filter cartridge. The manifold cap further defines a downwardly open pair of vertically elongated cam tracks formed in the opposed side walls thereof, for slide-fit reception of the cam pins on the filter cartridge. Initial filter cartridge installation is performed by initially pivoting the manifold cap about the axis of the valve body towards a partially raised, angularly outward orientation. This partially raised cap position is sufficient for the cap cam tracks to clear the forward or distal ends of the bracket cam tracks, and thereby accommodate unobstructed slide-in reception of the cartridge cam pins.

The initial filter cartridge installation, in particular the alignment of the longitudinal axis of the filter cartridge with the inlet and outlet fittings of the manifold, is still difficult to achieve. Alignment is only ensured when the cartridge inlet and outlet ports are inserted into the inlet and outlet fittings, but they must then be strong enough to withstand the force due to the weight of the filter cartridge.

It is another object of the invention to provide a liquid treatment cartridge of the type mentioned above in the second paragraph that is suitable for axial insertion into a receiving part journalled to swivel within the head part with the cartridge inserted, of which the axis can be aligned with the direction of insertion dictated by the receiving part relatively easily.

According to a first aspect of the invention, the first object is achieved by a liquid treatment cartridge according to the invention that is characterised in that the at least three liquid ports at ends of respective channels defined by the housing part include at least a fourth liquid port.

The liquid treatment cartridge includes a housing. An axis of the housing is defined by the intended direction of insertion of the liquid treatment cartridge into a head part of a liquid treatment system. The axis will generally correspond to the longitudinal axis, except possibly in the case of liquid treatment cartridges with an unusually squat shape and thus a relatively low volume. A housing part forms an axial end of the housing and includes a connecting head forming the axial end of the housing. The housing part includes a body that can be produced in large numbers to assemble a range of different liquid treatment cartridges. By providing different sets of at least one separate flow conductor part, distinct from but attached to this body, the variants can be made to differ in terms of the manner in which liquid is conducted into, through and out of the liquid treatment cartridge. The connecting head includes at least four liquid ports, each at an end of a respective channel defined by the housing part. The liquid ports are arranged so that liquid can pass through them, i.e. they are liquid-permeable ports. The channels are provided in the body part. The connecting head is configured for insertion into a head part of a liquid treatment system such that the liquid ports of the connecting head are in sealed liquid communication with respective liquid ports in the head part. To this end, seals may be provided on or around the liquid ports. Such seals could be separate from the body of the housing part or an integral feature. Because there are at least four such liquid ports at the ends of respective channels, it is possible to provide all the inlets and outlets at one axial end of the liquid treatment cartridge. This is of use when manufacturing a range of cartridges, because the axial length of the cartridge housing may vary between the different variants in the range. Furthermore, installation of the liquid treatment cartridge is easier, since there is only one head part. With at least four ports at the ends of respective channels, it is possible to ensure that there is not one channel and port that restricts the rate of flow through the liquid treatment cartridge. If, for example, there are two separate inlet flows and one type of treated liquid is to be provided, this liquid can be provided through two outlet ports of similar size to the two inlet ports. Conversely, it is possible to provide two outlet flows of different composition through respective ports and to provide liquid with one particular composition through two inlet ports to ensure that the flow rate is not limited by the dimensions of the inlet ports. Even if there is only one type of liquid entering the liquid treatment cartridge and one type of liquid leaving it in use, the throughput can be increased by providing two inlet ports and two outlet ports. Compared to providing one large inlet port and one large outlet port, the diameter of the connecting head can be kept relatively low without having to give the ports an elongated shape, e.g. by arranging two round ports in a generally axially aligned row or by distributing the ports at 90° intervals around the axis.

In the present context, the separation brought about by the separate flow conductor parts is such that at least one flow conductor part is positioned between the separated interior ends to at least force any liquid flowing from one of the interior ends to the other to flow through the conduit. The liquid emerging from one of the separated interior ends is carried away from the housing part, but may return to the separated interior end after passing through a liquid treatment part. Generally, any path between the separated interior ends will be through a conduit defined by at least one of the separating flow conductor parts. The at least one separate flow conductor parts thus determine which ports function as inlet ports and which ports function as outlet ports. They also determine whether multiple inlet ports or multiple outlet ports are isolated such that the flows of liquid provided through them do not mix inside the cartridge.

In an embodiment, the housing part includes a single moulded body in which the liquid ports and channels are formed.

This embodiment allows for easy manufacturing and assembly. It is only necessary to provide sealing rings and the like on the exterior. Such sealing elements may even be co-moulded. The housing parts may further include one or more keying elements to differentiate between the different variants of liquid treatment cartridge, but these can be relatively small and easily applied to the exterior of the housing part. In one variant of this embodiment, the ports are moulded. In another variant, the housing part is moulded with at least one channel closed by a blocking part that can easily be separated to free the channel. This may be a disc connected to the channel wall by a frangible connection, for example.

In an embodiment, at least one of the at least one flow conductor parts is plugged into the housing part, e.g. into an interior end of at least one of the channels.

This embodiment is relatively easy to assemble. Few or no fasteners are required to attach the at least one flow conductor parts to the housing part. Furthermore, the housing part can be relatively compact, since there is no need to provide space for a separate connection mechanism if the flow conductor parts are plugged into the interior ends of the channels. In a variant, the plugged-in part is held in place by a friction fit between it and the housing part. For example, a conduit section with a cross-sectional shape corresponding essentially to that of the interior end of the channel may be plugged into the channel. The friction-fit may be provided by at least one sealing element surrounding a conduit wall between the plugged-in end of the conduit and the channel wall.

In an embodiment, the housing includes a vessel, and the housing part forms a cap closing off the vessel at an axial end of the vessel.

The vessel can have a relatively large axial extent, i.e. be relatively deep. It forms a chamber for housing at least one liquid treatment part of the liquid treatment cartridge. The chamber is closed at an axial end by the cap. The cap can be relatively shallow, so that the inside is accessible relatively well for attachment of flow conductor parts. The vessel will generally be closed at the opposite axial end, so that all the ports of the liquid treatment cartridge are provided in the connecting head of the housing part forming the cap.

In an embodiment, the connecting head projects in axial direction with respect to a remainder of the housing part.

The head part of the liquid treatment system of which the liquid treatment cartridge forms a replaceable component can thus be relatively compact. The same is true of the connecting head. The liquid treatment cartridge, however, can still have a relatively large volume without the need to increase its axial dimension.

In an embodiment of the liquid treatment cartridge, at least one of the flow conductor parts is comprised in a liquid treatment assembly including a hollow, liquid-permeable liquid treatment component and arranged to conduct liquid radially through the liquid treatment component.

The liquid treatment component may include a hollow, porous, liquid-permeable block comprising liquid treatment material. The liquid treatment material of such a block may be granular, fibrous or a mixture of the two. It may be thermally bonded by a binder, e.g. in the form of particles. The liquid treatment material may include a sorbent, e.g. an adsorbent such as activated carbon or a sorbent for binding heavy metals. It may further or alternatively include an ion exchange resin. The flow of liquid is radially inwards into the hollow part of the block or radially outwards from the hollow part. The assembly may alternatively or additionally include a liquid-permeable core around which a mechanical filtration medium is wound. Examples include a string-wound module or a core around which at least one layer of liquid-pervious textile or a membrane is wound. The textile material may be a mesh, or non-woven material, for example. Such a layer of textile may also be incorporated in or wound around the hollow, porous, liquid-permeable block. The at least four ports ensure that the connecting head imposes a relatively low resistance to flow. The resistance to flow of the liquid treatment component can thus be relatively high for the same overall pressure drop across the liquid treatment system. This allows for more effective mechanical filtration or longer contact times with the liquid treatment material incorporated in the liquid treatment component, for example.

In an embodiment, which may be combined with the previous embodiment, the liquid treatment cartridge includes a bed of liquid treatment material, and at least one of the flow conductor parts includes a conduit for conducting liquid through the interior of the housing between the housing part and an axial location separated from the housing part by at least a section of the bed.

In this embodiment, adequate treatment by a liquid treatment material can be ensured by forcing the liquid to travel in axial direction over a relatively long distance through the bed. The flow conductor parts thus ensure that the contact time with the liquid treatment material is adequate. The low resistance of the connecting head compensates for the resistance to flow imposed by the bed of liquid treatment material. The liquid treatment material is essentially loose material. It may be granular, fibrous or a mixture of the two. It will generally be arranged to treat liquid by means of a diffusive process, thus benefiting from increased contact times. Examples include sorption, elution and ion exchange.

In a variant, one or more flow conductor parts are arranged to conduct liquid to the opposite axial end of the bed, from where it flows through the bed to the housing part. At least a channel with an interior end with a radially outer edge (with respect to the interior ends of the channels) is arranged to collect the liquid. In this embodiment, at least one resilient, liquid-pervious part may be arranged on the same side of the bed as the housing part to exert a compressive force on the bd. This helps counter channelling. In another embodiment, one or more flow conductor parts are arranged such that incoming liquid is collected on an opposite side of at least a section of the bed and conducted through the bed by one or more riser conduits. In either embodiment, a liquid-permeable screen may be arranged at an opening of the flow conductor part on an opposite side of at least a section of the bed. Furthermore, at least one of a flow distribution and a retaining part for retaining the liquid treatment material may be arranged on the same side of the bed as the housing part. This contributes to relatively uniform axial flow and helps keep the treated liquid free of liquid treatment material, respectively.

In an embodiment of the liquid treatment cartridge, the at least one flow conductor parts are arranged to separate interior ends of at least two of the channels from each other and from interior ends of at least a further one of the channels.

By separating interior ends of at least two of the channels from each other, the ports at their ends can both be inlet port or both be outlet ports, with the at least one further port being the other of the inlet and outlet ports. Liquid with a different composition can be provided through the respective inlet ports or respective outlet ports. Alternatively, it is possible to provide liquid through two inlet ports at a particular volumetric flow rate ratio.

In a variant of this embodiment, the at least one flow conductor parts are arranged to separate the interior ends of the at least two channels from each other and from each of at least two other ones of the channels, and at least two of the at least two other channels are in direct fluid communication.

Direct communication results in the interior ends of channels being separated only by the housing part itself, if at all. The two channels in direct fluid communication are used to increase the rate of flow through the liquid treatment cartridge. In one implementation of this embodiment, the liquid treatment cartridge is arranged to treat two separate incoming flows of liquid differently or to a different extent and then mix them. The volumetric flow rate ratio may differ from one, e.g. in accordance with settings of the head part of the liquid treatment system in which the liquid treatment cartridge is comprised. This sets the mixing ratio. The mix can be provided through two ports, increasing the throughput of the cartridge. In another implementation of this embodiment, the liquid treatment cartridge is arranged to receive the incoming liquid as two flows through separate inlet ports. The flows are immediately mixed, e.g. for pressure equalisation purposes. The resultant flow of liquid is split into two sub-flows within the liquid treatment cartridge, which the liquid treatment cartridge is arranged to treat differently or to a different extent and then provide as separate output streams through different respective outlet ports. The two inlet ports increase the throughput. This configuration is also suitable for implementing a reverse osmosis or ultrafiltration cartridge providing as output a flow of filtrate and a flow of retentate. There is a lower pressure drop on entry of the liquid into the cartridge housing.

In an alternative variant of the embodiment in which the at least one flow conductor parts are arranged to separate interior ends of at least two of the channels from each other and from interior ends of at least a further one of the channels, the at least one flow conductor parts are arranged to separate interior ends of at least four of the channels from each other, and the liquid treatment cartridge includes at least one part for dividing a flow of liquid received through one of the four channels into at least two sub-flows conducted to different locations within the cartridge.

This variant allows a single liquid treatment cartridge to provide three different outputs, e.g. two streams of liquid treated differently or to a different extent and one mix of liquid from these streams. Alternatively, three differently treated streams of liquid may be provided as output. In one implementation, the liquid treatment cartridge includes at least one compartment including a liquid treatment material for the treatment of liquid by ion exchange and at least one of the sub-flows bypasses at least one of these compartments. In a particular example of such an implementation, there are three compartments: one includes cation exchange medium in the hydrogen form for reducing the carbonate hardness of water; one includes an anion exchange medium in the hydroxyl form; and the third is empty or includes a different liquid treatment medium. In this example, the liquid treatment cartridge can provide one stream of liquid with reduced carbonate hardness, one stream of liquid with reduced mineral contents and one stream of liquid left untreated, having less reduced carbonate hardness or just cleaned of organic contaminants and/or heavy metals. In this example, there would be two splits. One is upstream of the cation exchange compartment to create the sub-flow for the compartment that is empty or contains only a sorbent other than ion exchange material. The remainder goes through the compartment with cation exchange material. This stream is then split again subsequent to treatment. Some liquid bypasses the compartment with the anion exchange material to provide liquid with reduced carbonate hardness only. Some passes through the compartment with anion exchange material to produce demineralised liquid.

In an alternative implementation, there are two compartments in the interior of the cartridge housing. One includes a cation exchange material in the hydrogen form for reducing the carbonate hardness of water. The other is empty or includes a sorbent such as activated carbon or a cation exchange material that is not or less effective in reducing the carbonate hardness of water. Liquid entering through the inlet port is split into two sub-flows, each led to a respective one of the compartments. The flows are split at the exits of the compartments to provide four sub-flows. One from each compartment is mixed and the other is kept separate. Three separate flows of liquid with different compositions are thus provided at respective outlet ports.

It follows from the above that an embodiment of the liquid treatment cartridge includes at least one compartment including at least a medium for the treatment of liquid by ion exchange, wherein the liquid treatment cartridge is arranged to conduct at least one of a flow of liquid received through at least one of the liquid ports and a sub-flow of liquid obtained by dividing the flow of liquid into sub-flows through the interior of the housing so as to bypass at least a section of at least one of these at least one compartments.

In an embodiment of the liquid treatment cartridge, the interior end of at least one of the channels is provided within at least one of the other channels.

This contributes to keeping the width—corresponding to the dimensions transverse to the axis—of the connecting head relatively low for a given channel diameter, compared to having the interior ends positioned side by side. Furthermore, the flow conductor parts can easily be used to adapt the cartridge from a default configuration, in which the flows of liquid passing through the respective ports mingle, to one in which they are kept separate in the housing part. This is accomplished by at least one flow conductor part including a conduit extending from the interior end through the at least one channel in which the interior end is provided. A ring-channel is then formed between the innermost one of these channels and the flow conductor part extending through it.

In a variant of this embodiment, at least end sections at the interior ends of the channels are arranged concentrically, This makes it relatively easy to keep flows of liquid within the cartridge housing separate, by separating them radially, but also keep flow patterns simple and relatively uniform. Uniform axial flow conditions are in particular achievable by centring channels and conduits on a central axis of the cartridge housing and making conduits essentially rotationally symmetric.

In an embodiment, at least radially inner ones of the channels have interior ends directed essentially axially into the interior of the housing.

This eases assembly of the cartridge, in particular the attachment of flow conductor parts to the housing part. The interior ends form a port of which the edge defines a plane essentially perpendicular to the axial direction and/or the corresponding end section of the channel has a longitudinal axis essentially parallel to the axial direction. Especially where the interior end of one channel is located within one of the other channels, it is easy to plug in a straight tube or similar conduit. Elbow pieces are not required, and would be much more difficult to plug into the interior end of a channel.

In an embodiment, a majority, e.g. all, of the ports are provided in surface sections of the connecting head facing in a direction at an angle to the axial direction.

To provide four ports at the axial end of the connecting head would otherwise require four concentric tubes having exits at different axial locations, and thus require a relatively deep cavity in the head part for receiving the connecting head. By contrast, with the ports provided in surface sections of the connecting head facing in a direction at an angle to the axial direction, in particular an essentially transverse direction to the axial direction, the channels at the ends of which the ports are provided may be relatively short (in axial direction). In an embodiment, at least two of the ports are provided in surface sections facing in different directions, e.g. opposite directions. These ports can thus be at overlapping axial positions. In an embodiment, at least two of the ports are provided at different axial locations in a common surface section. This surface section faces in essentially one direction. There is then no need to provide ports all around the connecting head. This can be of use where the connecting head is to be inserted into a cavity defined by a receiving part that is journalled for motion with respect to a supporting part of the head part. Two of the four ports may be provided in the same or different surface sections facing in essentially a first common direction and two of the four ports may be provided in the same or different surface sections facing in essentially a second common direction, different from the first direction. The components of the first and second directions perpendicular to the axial direction may be essentially oppositely directed. A simple variant is where pairs of ports are provided on opposite sides of the connecting head. This arrangement also simplifies the construction of the head part. For example, where multiple head parts are arranged in a row, e.g. mounted on a wall, the row can be relatively narrow if the ports are arranged to face essentially in the direction of alignment of the head parts in the row.

In a variant, the surface sections are essentially planar.

This variant makes it relatively easy to provide a sealed connection between the ports and ports in the cavity of the head part into which the connecting head is inserted. The seals will lie in a plane and can press relatively uniformly against a planar surface.

In a variant, the surface sections are inclined with respect to the axis, such that the connecting head tapers towards the axial end of the housing.

In this variant, sealing elements provided on or around the ports of the cartridge contact the walls of the cavity of the head part into which the connecting head is inserted only at the end of the path of insertion. This reduces the risk of damage or dislodgement to the sealing element. This applies mutatis mutandis where the sealing elements are provided on or around ports in the walls of the cavity and arranged to contact the inclined surface sections at the end of the path of insertion.

According to a second aspect, the second object mentioned above in the opening paragraphs is achieved by a liquid treatment cartridge, e.g. in accordance with one of the above-mentioned embodiments, that is characterised in that the alignment part for insertion into a groove are arranged to contact the groove at multiple axial locations simultaneously.

The liquid treatment cartridge includes a housing. An axis of the housing is defined by the intended direction of insertion of the liquid treatment cartridge into a head part of a liquid treatment system. The axis will generally correspond to the longitudinal axis, except in the case of liquid treatment cartridges with a relatively low volume. A housing part forms an axial end of the housing and includes a connecting head forming the axial end of the housing. The connecting head is configured for insertion into a head part of a liquid treatment system such that the liquid ports of the connecting head are in sealed liquid communication with respective ports in the head part. To this end, seals may be provided on or around the ports. Such seals could be separate from the body of the housing part or an integral feature. The liquid ports are arranged so that liquid can pass through them, i.e. they are liquid-permeable ports. The connecting head is insertable in axial direction into a cavity of a receiving part of the head part movably journalled with respect to a housing of the head part. In a situation in which the head part is e.g. attached to a wall, the liquid treatment cartridge can be inserted in a direction at an angle to the wall, and then swivelled into place. The connecting head is already fully inserted into the receiving part cavity at this stage. The connecting head includes at least one alignment part for axially aligning the receiving part with the liquid treatment cartridge during insertion of the connecting head into the recess. This facilitates the axial insertion and avoids stresses on parts of the connecting head or receiving part at the position of the port, e.g. sealing elements. The alignment part or parts is or are each provided on an external surface of the connecting head for insertion into a respective, generally essentially straight, groove of the receiving part when the connecting head is inserted into the recess. There may be multiple alignment parts, e.g. pins, providing multiple points of contact with the groove or there may be a single alignment part arranged to contact the groove at multiple axial locations. The liquid treatment cartridge may be arranged for use with a receiving part provided with multiple grooves, so that the arrangement of one or more alignment parts is replicated once for each further groove. Since a line is defined by at least two points, alignment is achievable with only the alignment parts and grooves, which can be dimensioned and shaped appropriately to withstand the arising forces. The external surface or surfaces referred to will generally be exposed surfaces defining a radial extent of the connecting head at the axial position of the alignment part or parts, so that the latter can indeed enter the groove. That is to say that these surfaces will generally be planar or convex. If they are nevertheless concave, the alignment part or parts will have a sufficient elevation with respect to the surface or surfaces to protrude from the recessed part of the surface section in which they are provided.

In an embodiment, at least one of the alignment parts is a ridge on the external surface.

Compared to a row of separate alignment parts providing multiple points of contact at multiple axial locations, a ridge allows for easier insertion of the connecting head into the receiving part. Furthermore, it is easier to provide a relatively strong ridge, which can also contribute to strengthening the wall on which it is provided. The ridge may extend in an essentially straight line parallel to the axis.

In a variant, the ridge is provided on a surface section of the connecting head inclined with respect to the axis, such that the connecting head tapers towards the axial end of the housing, and an elevation of at least a section of the ridge with respect to the surface section increases in axial direction towards the axial end of the housing.

In this variant, the ports can also be provided in inclined surface sections inclined with respect to the axis such that the connecting head tapers toward the axial end of the housing. Sealing elements provided on or around the ports of the cartridge contact the walls of the cavity of the head part into which the connecting head is inserted only at the end of the path of insertion. This reduces the risk of damage or dislodgement to the sealing element. This applies mutatis mutandis where the sealing elements are provided on or around ports in the walls of the cavity and arranged to contact the inclined surface sections at the end of the path of insertion. Because of the increasing elevation of the ridge with respect to the surface section, the ridge can enter the groove at the start of insertion to fulfil its alignment role.

In an embodiment, at least a section of the ridge has parallel opposing surfaces extending in axial direction and in a direction of elevation from the surface section on which the ridge is provided.

The ridge, or at least a major section of it, is thus shaped essentially as a parallelepiped placed on the surface. It may have a tapering or chamfered leading axial end section, however. It has a constant width in the plane of the surface section, allowing it to guide the connecting head along the length of at least the major section. By contrast, curved or tapering ridges would not provide a straight line or surface of contact with the edges of a groove.

In an embodiment, at least one of the alignment parts is positioned adjacent a row of at least two liquid ports.

Where the ports are in a side surface section of the connecting head at different axial positions, one above the other, they should be in a central position on the side surface section to allow them to be relatively large. Positioning the alignment parts adjacent the row keeps the height of the connecting head relatively small and ensures alignment of the ports with the ports in the cavity with which a sealed connection is to be established. The alignment parts, since they project anyway to allow them to enter a groove, can be provided on a surface section with relatively small radius of curvature with the row of ports being provided in an adjacent surface section with a relatively large radius of curvature or a planar surface section.

In an embodiment, the alignment parts are at least two in number.

The alignment parts are arranged for insertion into different respective grooves. This helps ensure the correct rotary position of the connecting head relative to the receiving part and with respect to the axis.

In an embodiment, the alignment part functions as a retaining part for retaining the liquid treatment cartridge in a position with the connecting head at least partly inserted into the head part.

This embodiment avoids the need for separate retaining features on e.g. the connecting head. There is thus more space for the alignment part or parts and the ports.

In an embodiment, an axial end of the retaining part distal to the axial end of the housing has a rounded shape.

This axial end can move relatively easily along a ledge with which it co-operates to retain the liquid treatment cartridge in the head part even when the receiving part is still being moved.

According to another aspect of the invention, there is provided a set of liquid treatment cartridges, each according to at least the opening paragraph and optionally including the features of any of the liquid treatment cartridges described above, wherein at least bodies of the housing parts forming the axial ends of the housings of the respective liquid treatment cartridges are essentially identical in shape and dimensions, and wherein the flow conductor parts of at least two of the liquid treatment cartridges separate the interior ends of the at least four channels differently.

This set of liquid treatment cartridges can be manufactured relatively efficiently, because the housing part bodies for all of the variants can be manufactured in large numbers. Which type of liquid treatment cartridge is produced can be determined at a relatively late stage in the manufacturing process. The bodies of the housing parts are the parts of the housing parts that include the most material and support any remaining parts of the housing parts, such as sealing elements, keying parts, labels, and the like. A different one of several possible sets of at least one flow conductor parts is attached to the housing part, such that the interior ends of the at least four channels are separated differently in the two cartridges. The set may include a liquid treatment cartridge having two inlet ports and two outlet ports, of which the outlet ports are arranged to provide streams of liquid with different compositions. An example is a reverse osmosis or ultrafiltration cartridge. The set may include a liquid treatment cartridge having two inlet ports for receiving separate streams of liquid that are kept separated upstream of a liquid treatment part, wherein two outlet ports are arranged to provide streams of liquid with the same or a different composition. An example is a liquid treatment cartridge for providing a mix of water with reduced carbonate hardness at relatively high flow rates or for providing streams of liquid with different levels of carbonate hardness.

The set may include a liquid treatment cartridge having one inlet port and three outlet ports for providing flows of liquid with different compositions. An example is a liquid treatment cartridge for providing water with reduced carbonate hardness, water with a reduced mineral content and water with merely a reduced level of contaminants in parallel. Another example is a liquid treatment cartridge for providing streams with different levels of carbonate hardness.

In an embodiment, the at least two liquid treatment cartridges differ in terms of at least one of:
 (i) the number of liquid ports arranged to function as inlet ports; and
 (ii) the number of liquid ports arranged to function as outlet ports.

This increases the range of different types of liquid treatment cartridge that can be manufactured. Some types may have a balanced number of inlet and outlet ports to provide a relatively high throughput. Some types may have more outlet ports than inlet ports, in order to provide liquids with different compositions as output.

In an embodiment, the at least two liquid treatment cartridges further differ in terms of at least one of whether and how many liquid treatment components of each of the following types they include:
 (i) a membrane filtration module;
 (ii) a bed of material for the treatment of liquid by means of a diffusive process, e.g. at least one of ion exchange, sorption and elution; and
 (iii) a component including a liquid-permeable porous body of thermally bonded material for the treatment of liquid by means of a diffusive process, e.g. at least one of ion exchange, sorption and elution.

These types generally each require a different configuration of inlet and outlet ports. They can be provided with housings having at least a common head part. The separate flow conductor parts are chosen appropriately for each type.

According to another aspect of the invention, there is provided a method of manufacturing at least one of range of liquid treatment cartridges, each according to at least the opening paragraph and optionally including the features of any one of the liquid treatment cartridges described above, including selecting and attaching one of a number of different sets of at least one flow conductor part to configure the liquid treatment cartridge.

In an embodiment, a next one of the range of liquid treatment cartridges is manufactured to include a housing part of which at least a body is identical in shape and dimensions to that of the housing part of the previous liquid treatment cartridge, wherein a different one of the sets is selected and attached, such that the interior ends of the at least four channels are separated differently in the two cartridges.

It is thus possible to provide a range of different liquid treatment cartridges for different applications, e.g. a high-throughput cartridge, one for reducing the carbonate hardness of water to an adjustable level, a reverse osmosis cartridge, etc.

It follows that, in a variant, different types of liquid treatment parts are arranged in the housings of the two liquid treatment cartridges.

The different liquid treatment parts may differ according to the type of liquid treatment (e.g. mechanical filtration, ion exchange, adsorption of contaminants) they are arranged to carry out or merely according to the degree of treatment.

According to another aspect of the invention, there is provided a liquid treatment system including at least one head part and at least one replaceable liquid treatment cartridge according the invention.

BRIEF DESCRIPTION OF THE DRAWINGS

The invention will be explained in further detail with reference to the accompanying drawings, in which.

DETAILED DESCRIPTION

Figure 1:
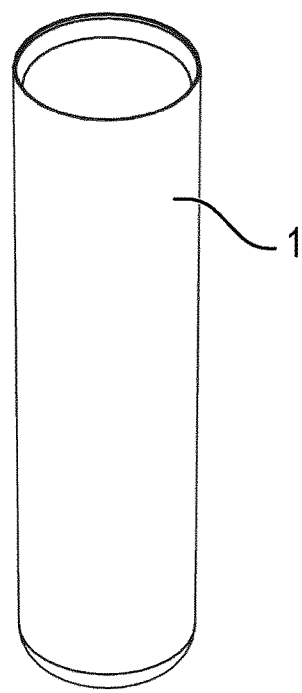
FIG. 1 is a perspective view of a beaker-shaped part of a housing of a liquid treatment cartridge.
Figure 2:
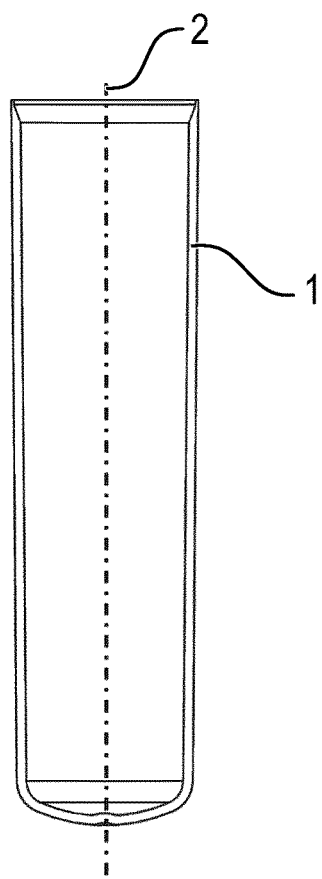
FIG. 2 is a cross-sectional view of the beaker-shaped housing part of FIG. 1.
Figure 3:
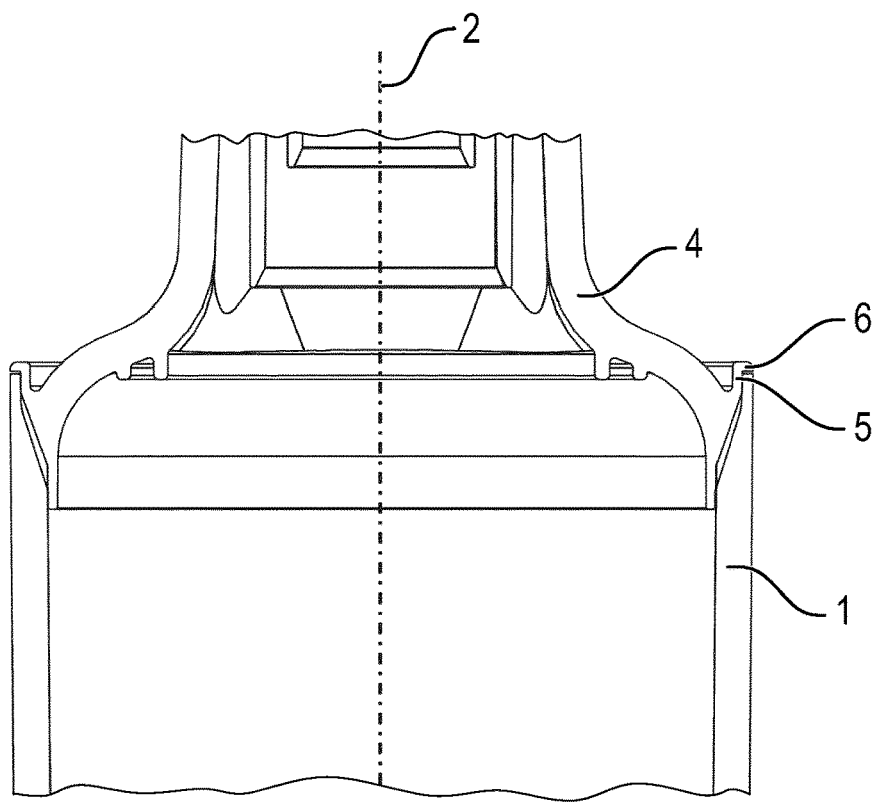
FIG. 3 is a detailed cross-sectional view showing a cap-shaped housing part closing an open end of the beaker-shaped housing part.
Figure 4:
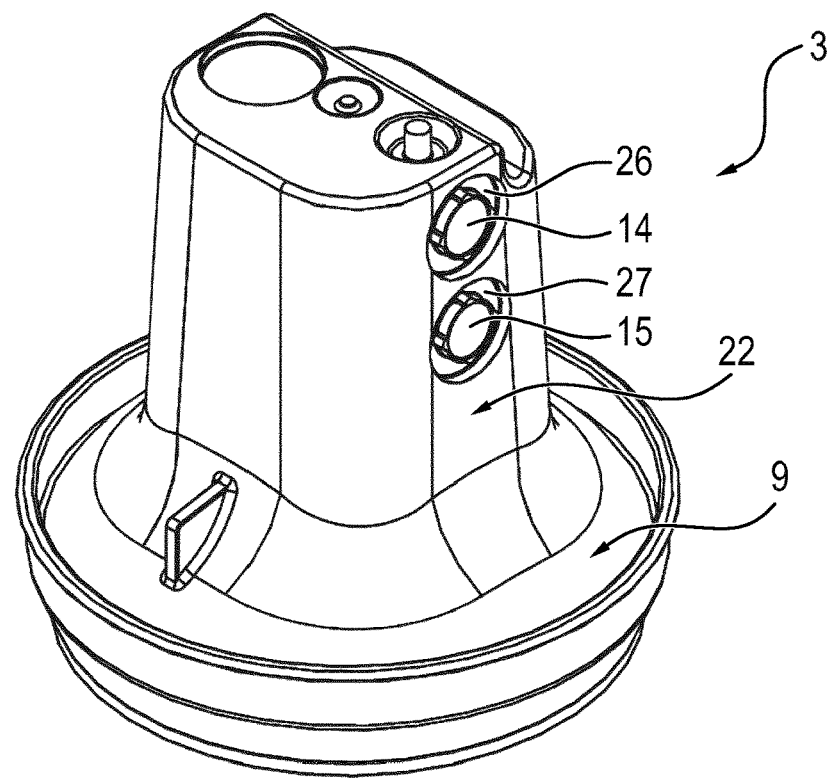
FIG. 4 is a perspective view of a first cap-shaped housing part.
Figure 5:
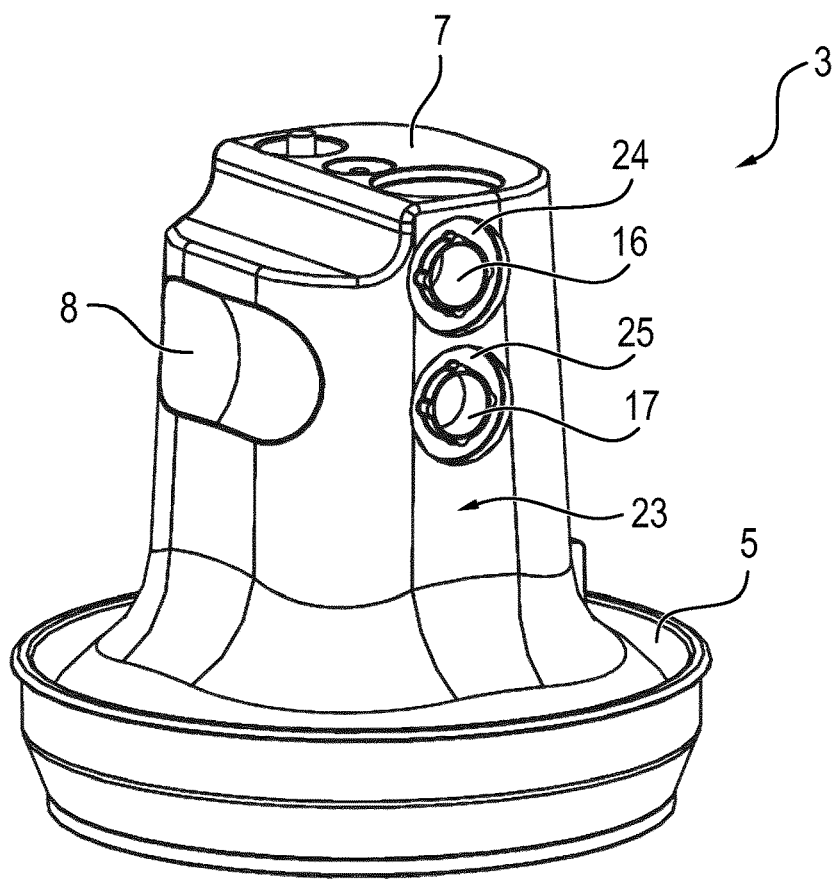
FIG. 5 is a further perspective view of the first cap-shaped housing part.
Figure 6:
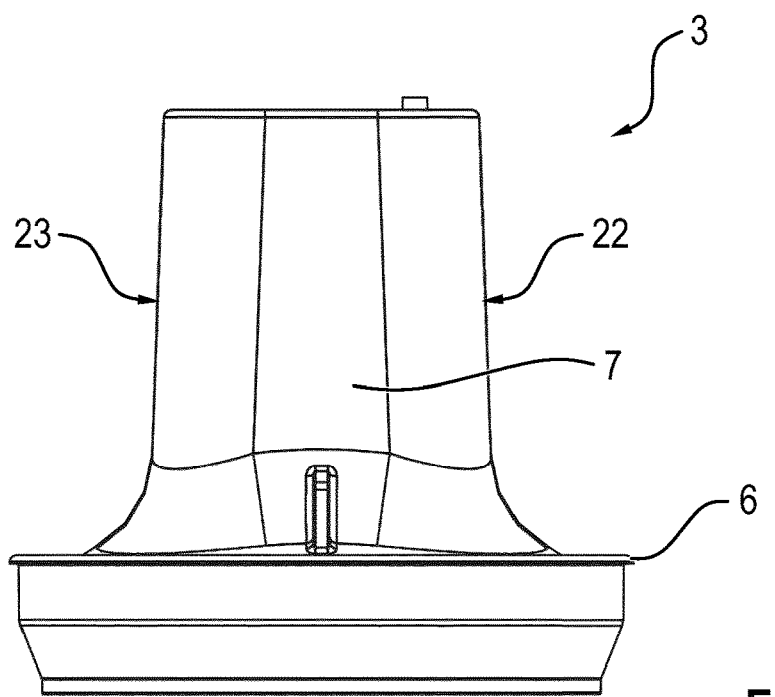
FIG. 6 is a plan view of a first side of the first cap-shaped housing part.
Figure 7:
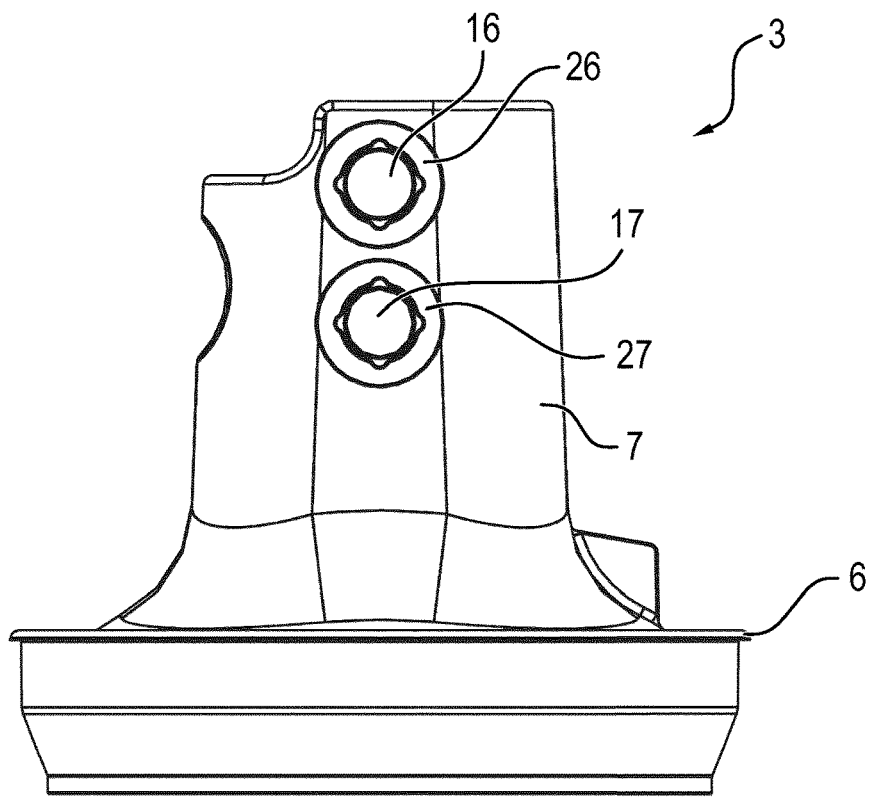
FIG. 7 is a plan view of a second side of the first cap-shaped housing part.
Figure 8:
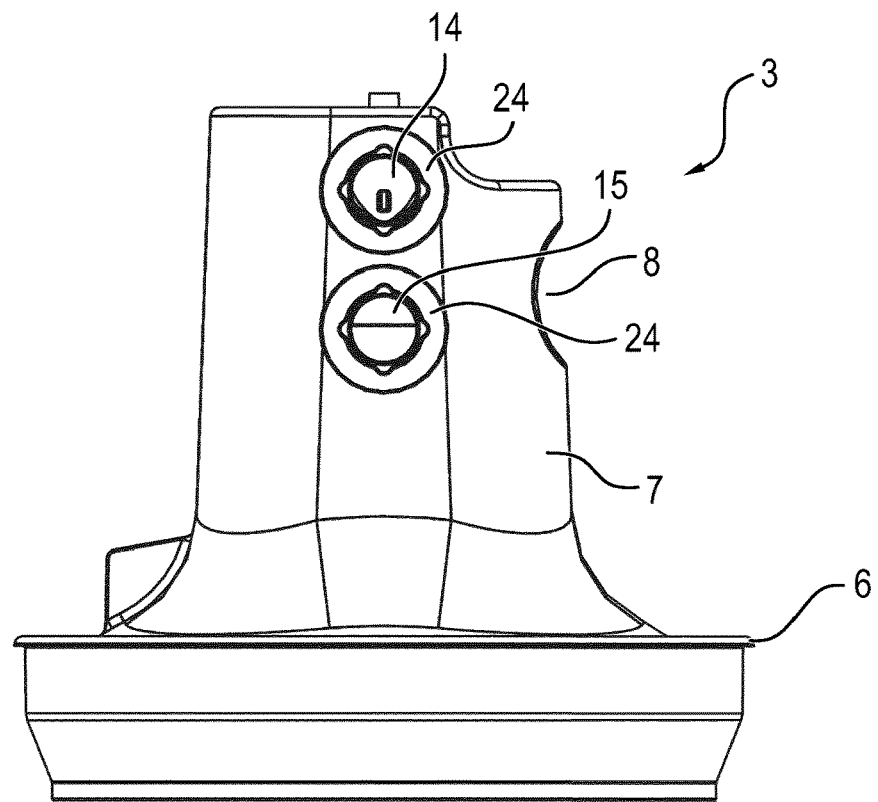
FIG. 8 is a plan view of a third side of the first cap-shaped housing part.

Liquid treatment cartridges as described in the following include a housing including a vessel in the form of a beaker-shaped housing part 1 (FIGS. 1-3, 22, 36-39). The beaker-shaped housing part 1 is elongated in shape. A central, in this example longitudinal, axis 2 (FIG. 2,3) of the liquid treatment cartridge forms an axis of reference. The beaker-shaped housing part 1 is closed at one axial end and open at an opposite axial end. It is essentially cylindrically shaped along the majority of its length. The closed axial end is rounded to withstand the pressure of liquid inside the beaker-shaped housing part 1 during use. The beaker-shaped housing part 1 may be made of metal, e.g. aluminium, or plastic, e.g. polypropylene. The open end of the beaker-shaped housing part 1 is closed by and irreversibly joined to a cap-shaped housing part.

A first cap-shaped housing part 3 (FIGS. 3-21) comprises a body 4 obtainable by moulding, e.g. injection-moulding, and will generally be made of plastic, e.g. polypropylene.

The body 4 is partially inserted into the open end of the beaker-shaped housing part 1 to increase the contact area. The joint may be a joint obtainable by welding, e.g. ultrasonic welding, soldering or adhesive bonding, for example. An upstanding surrounding ridge 5, in the example with a flange 6, aids in providing the joint. The flange 6 determines the correct insertion of the body 4. The ridge provides a radially inner surface against which a tool can be placed, e.g. an anvil or sonotrode in case of ultrasonic welding or a tool for exerting a pressing force in case of adhesive bonding.

Figure 9:
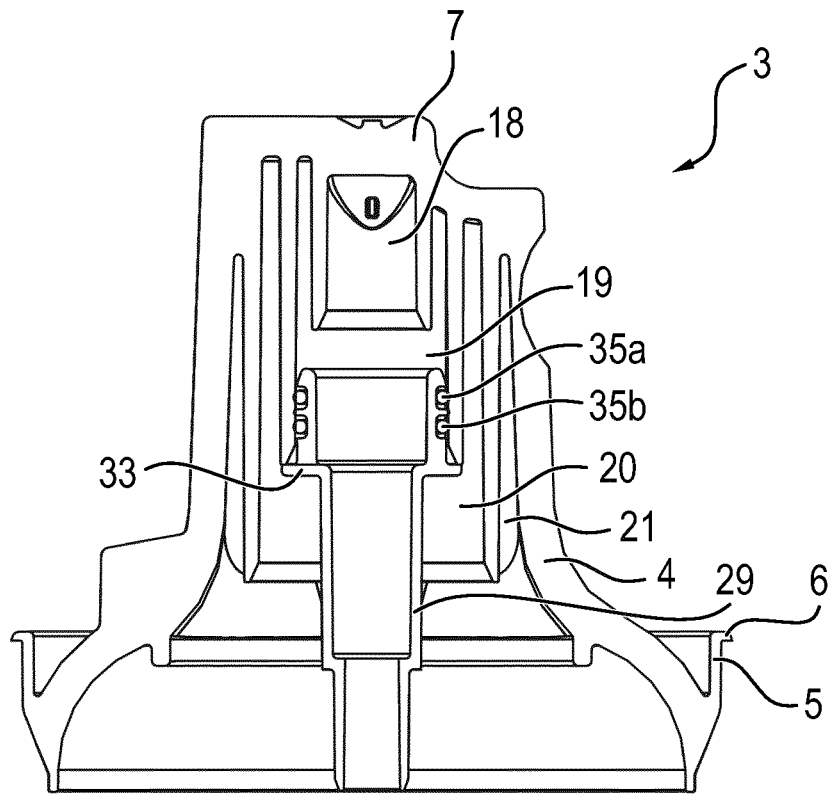
FIG. 9 is a first plan cross-sectional view of the first cap-shaped housing part in a first configuration of the liquid treatment cartridge.
Figure 10:
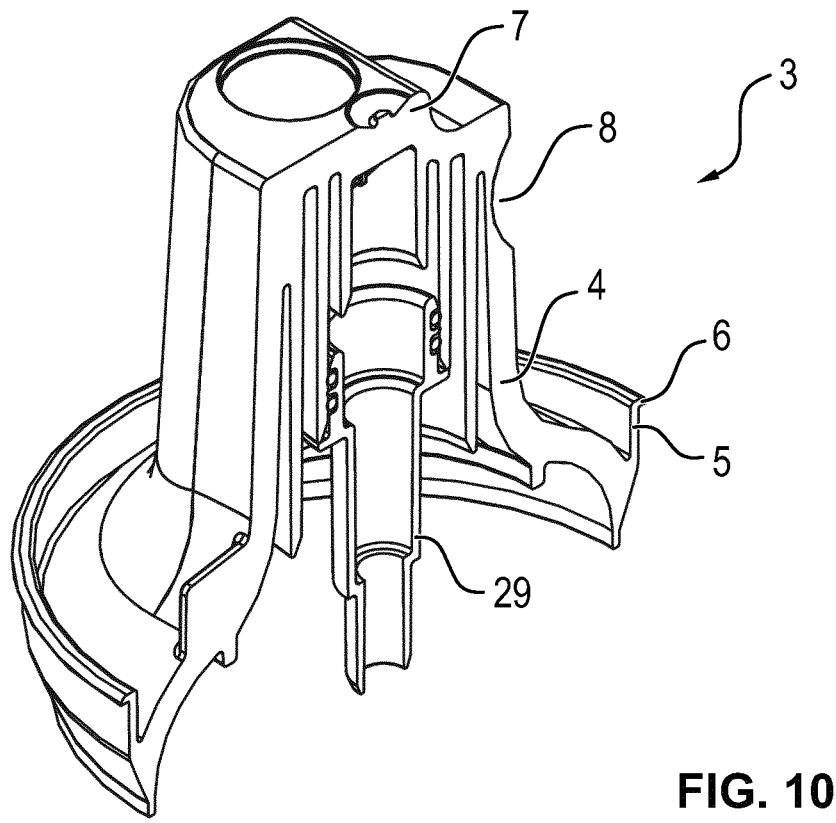
FIG. 10 is a perspective cross-sectional view of the first cap-shaped housing part in the first configuration.
Figure 11:
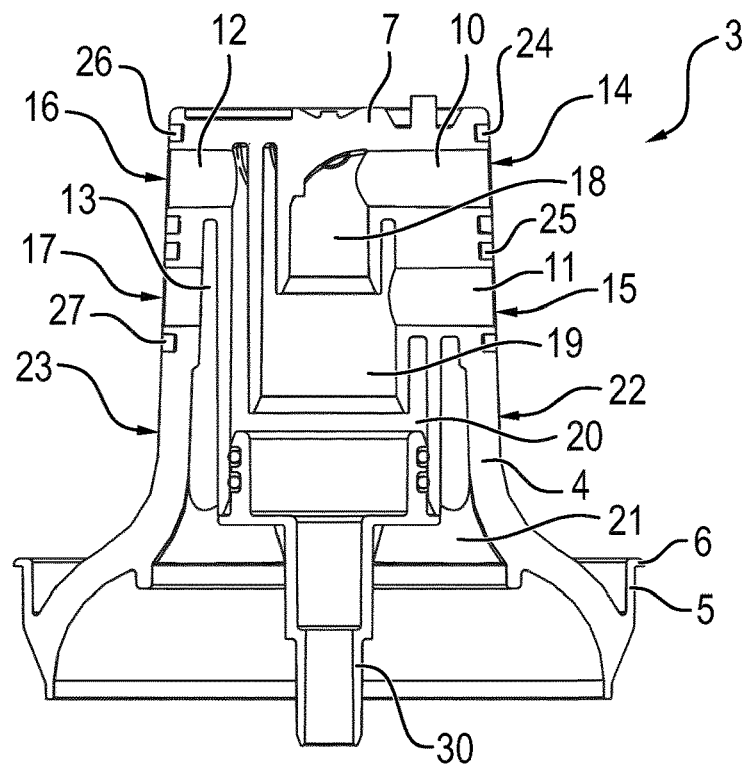
FIG. 11 is a second plan cross-sectional view of the first cap-shaped housing part in the first configuration.
Figure 12:
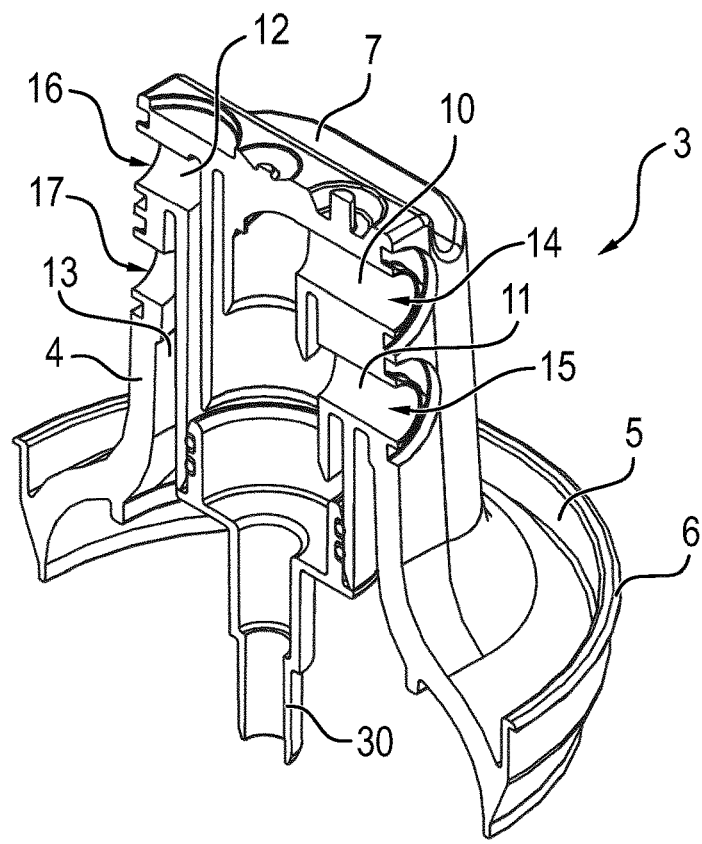
FIG. 12 is a second perspective cross-sectional view of the first cap-shaped housing part in the first configuration.

The housing part body 4 includes a connecting head 7 for insertion into a cavity of a head part of a liquid treatment system of the type disclosed e.g. in US 2010/0307964 A1, in particular in relation to FIG. 9b thereof. Thus, the connecting head 7 includes a recess 8 (FIGS. 5-9) in which a locking shaft (not shown) can be secured by rotating it from an unlocking position to a locking position.

The connecting head 7 projects in axial direction with respect to a remainder of the body 4, in particular a surrounding surface section 9 (FIG. 4) facing predominantly in axial direction.

Formed in the connecting head 7 are first to fourth channels 10-13, each with a respective port 14-17 at an end thereof and each with an interior end section 18-21 (FIGS. 9,11,13,17 in particular). End sections of the channels 10-13 at the opposite openings (i.e. at the ports 14-17) are essentially straight and directed radially. This simplifies the tooling for moulding the body 4 of the first cap-shaped housing part 3.

The interior end sections 18-21 are arranged concentrically, centred on the central axis. At least the central three interior end sections 18-21 are directed essentially axially into the interior of the cartridge housing. The ends of the first to third channels 10-12 at which the interior end sections 18-20 are provided each terminate at a different respective axial position, so that these interior ends are provided within at least one of the other channels, namely the surrounding channels. As a result, the second to fourth channels 11-13 include at least a section that is ring-shaped. Furthermore, liquid can mingle at these interior ends unless they are separated by separate flow conductor parts, as will be explained below.

The ports 14-17 are provided in pairs in inclined, in this example essentially planar, surface sections 22,23 on opposite sides of the connecting head 7. These surface sections 22,23 are inclined with respect to the central axis, but face in a predominantly transverse direction, such that the connecting head 7 tapers slightly. The angles between the planes of the surface sections 22,23 and the central axis are therefore acute and the angles between the normals to the surface sections 22,23 and the central axis are obtuse. The ports 14-17 are surrounded by grooves 24-27 in which sealing rings (not shown) can be retained. It is noted that the first and second inclined surface sections 22,23 may have a slight curvature, but the grooves 24-27 will generally position identical sealing rings essentially in planes to ensure uniform compression and thus sealing.

Simple first, second and third flow conductor parts 28-30 (FIGS. 17-21, FIGS. 9,10 and FIGS. 11-16, respectively) are configured to be plugged into the first, second and third interior end sections 18-20, respectively. They each include a conduit for conducting liquid through at least part of the interior of the cartridge housing so as to separate interior ends of at least two of the channels 10-13 from at least one other, e.g. all, of the remaining channels 10-13. At their ends opposite the ends that are plugged in, these flow conductor parts 28-30 may be connected to further flow conductor parts (not shown) or liquid treatment components to form an assembly. The first flow conductor part 28 separates the interior ends of the second and third channels 11,12 from that of the first channel 10. The second flow conductor part 29 separates the interior ends of the first and second channels 10,11 from those of the third and fourth channels 12,13. The third flow conductor part 30 separates the interior end of the first, second and third channels 10-12 from that of the one remaining channel, namely the fourth channel 13. It is noted that, in alternative embodiments, separation may only be achieved by an assembly of multiple flow conductor parts.

The first flow conductor part 28 includes a section having an outer diameter corresponding essentially to the inner diameter of the interior end section 18 of the first channel 10. This section ends at a flange 31 (FIG. 17) for engaging a wall of the interior end section 18 to determine the extent to which the first flow conductor part 28 is insertable. This section is provided with two sealing rings 32a,b providing for sealing between the first flow conductor part 28 and the wall of the interior end section 18. They also provide a friction-fit sufficient to hold the first flow conductor part 28 in position.

Figure 13:
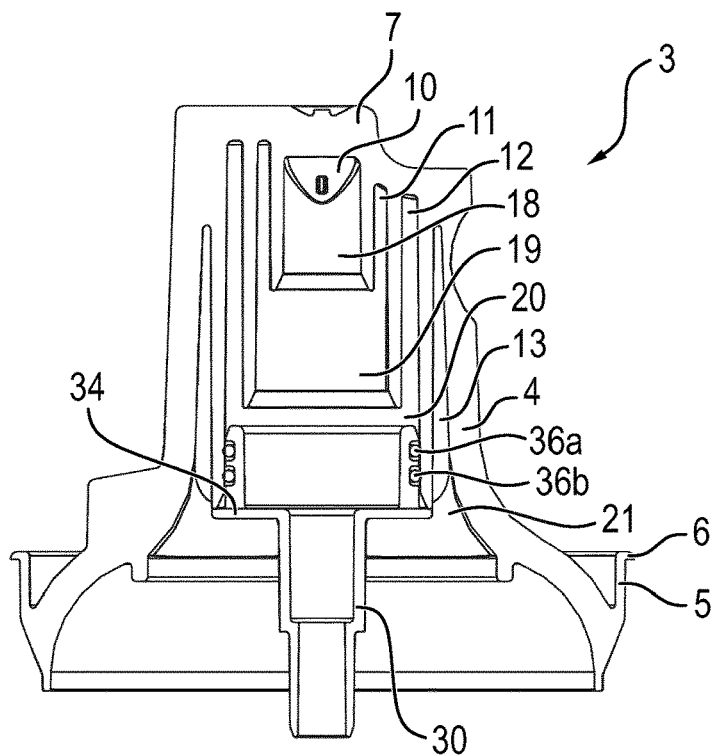
FIG. 13 is a third plan cross-sectional view of the first cap-shaped housing part in the first configuration.
Figure 14:
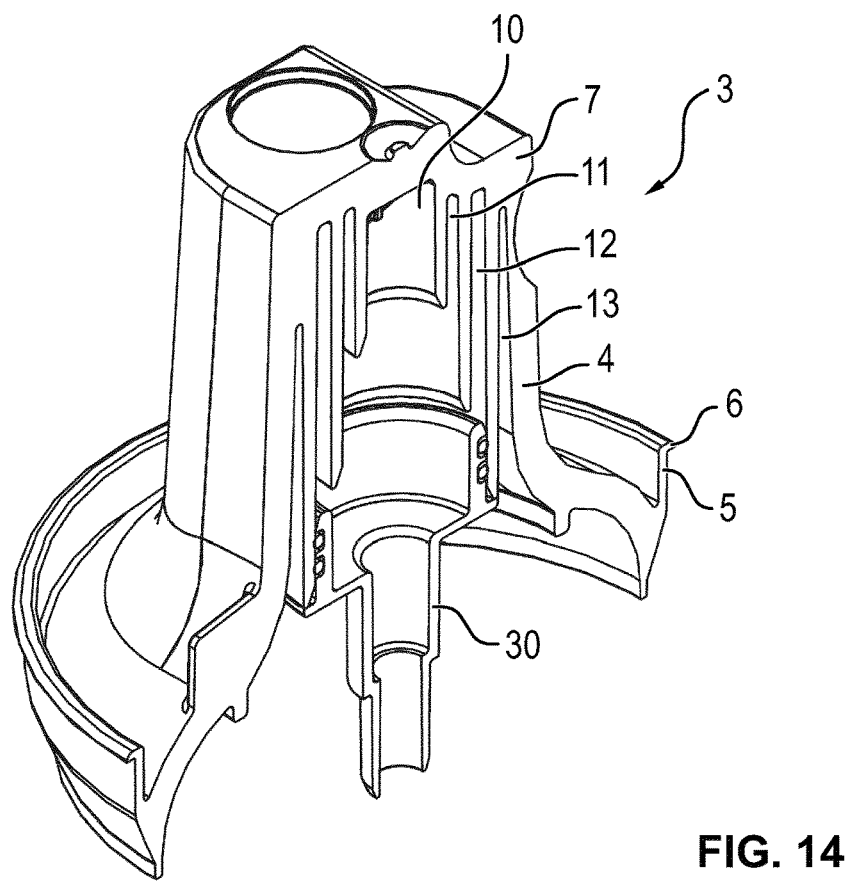
FIG. 14 is a third perspective cross-sectional view of the first cap-shaped housing part in the first configuration.
Figure 15:
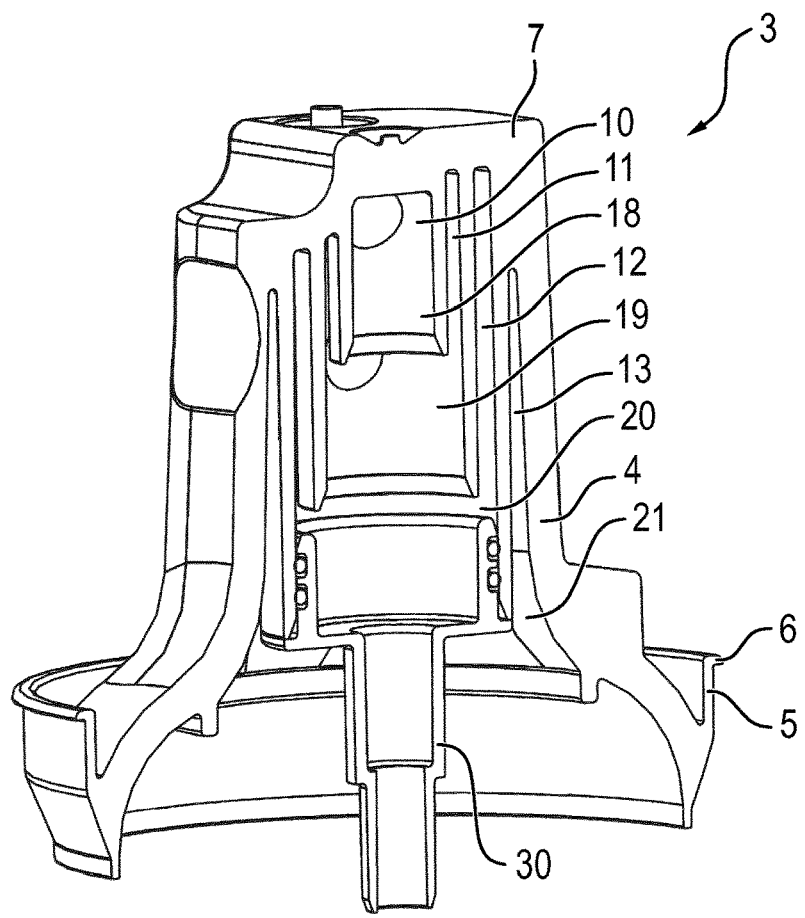
FIG. 15 is a first perspective cross-sectional view of the first cap-shaped housing part in a second configuration of the liquid treatment cartridge.
Figure 16:
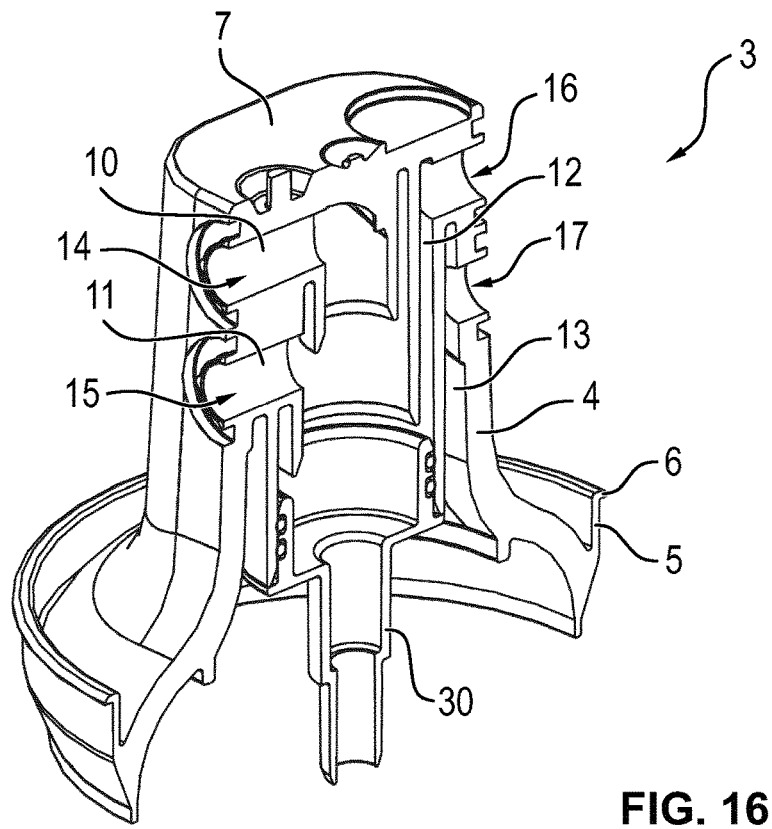
FIG. 16 is a second perspective cross-sectional view of the first cap-shaped housing part in the second configuration.
Figure 17:
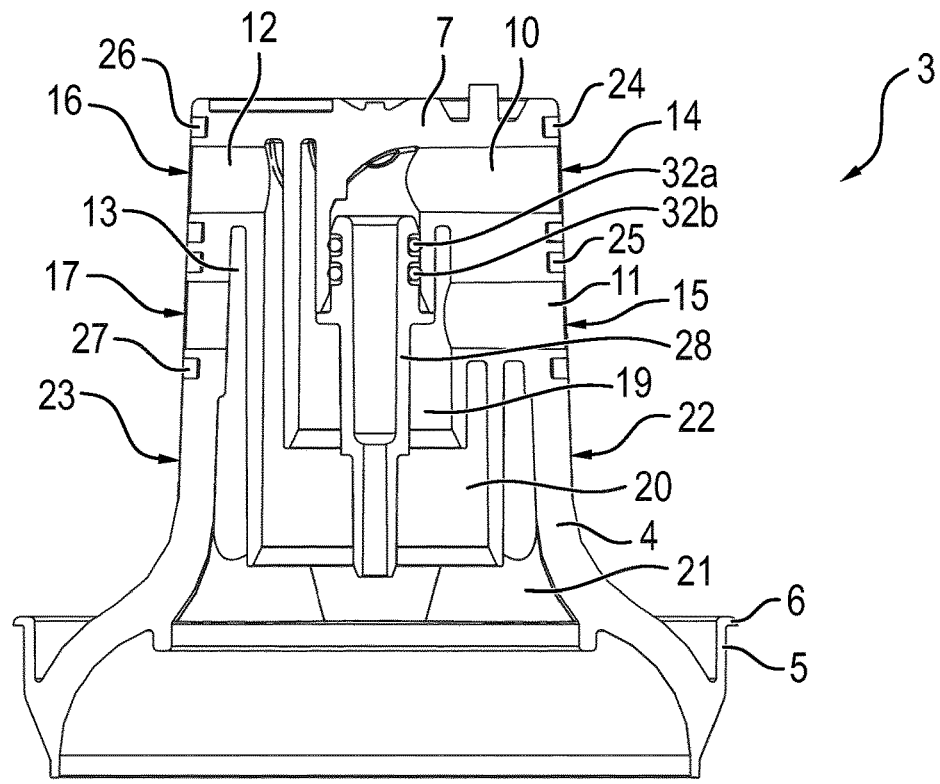
FIG. 17 is a plan cross-sectional view of the first-cap-shaped housing part in a third configuration of the liquid treatment cartridge.
Figure 18:
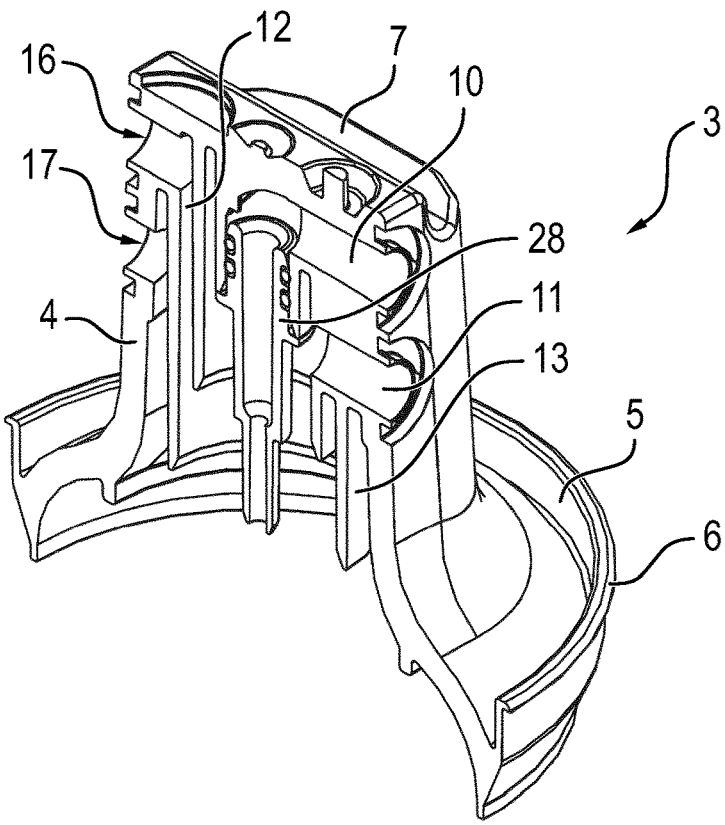
FIG. 18 is a first perspective cross-sectional view of the first cap-shaped housing part in the third configuration.
Figure 19:
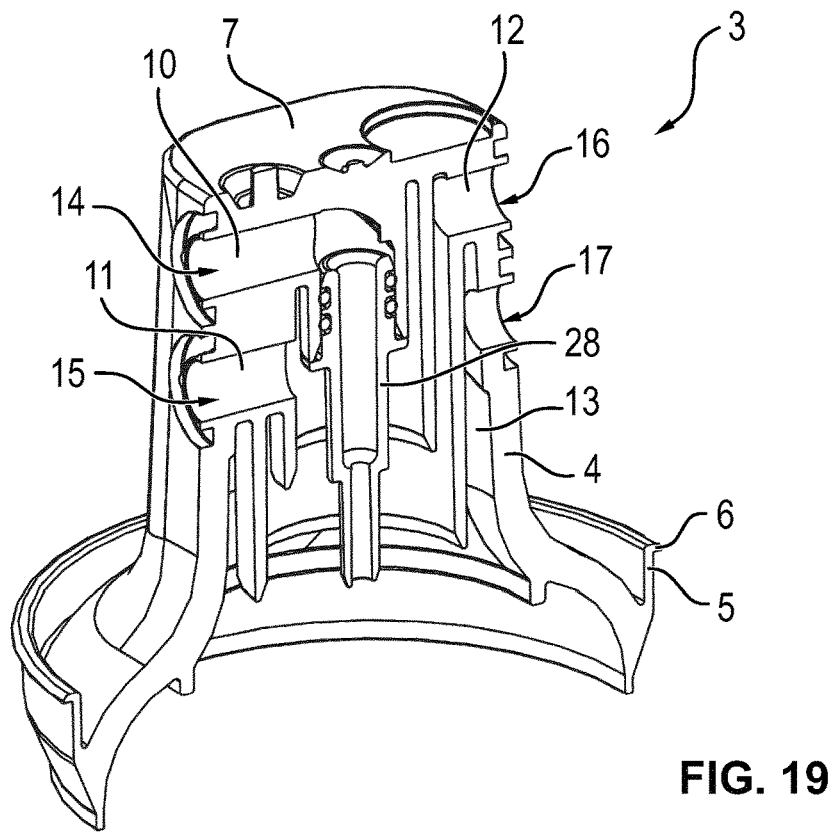
FIG. 19 is a second perspective cross-sectional view of the first cap-shaped housing part in the third configuration.
Figure 20:
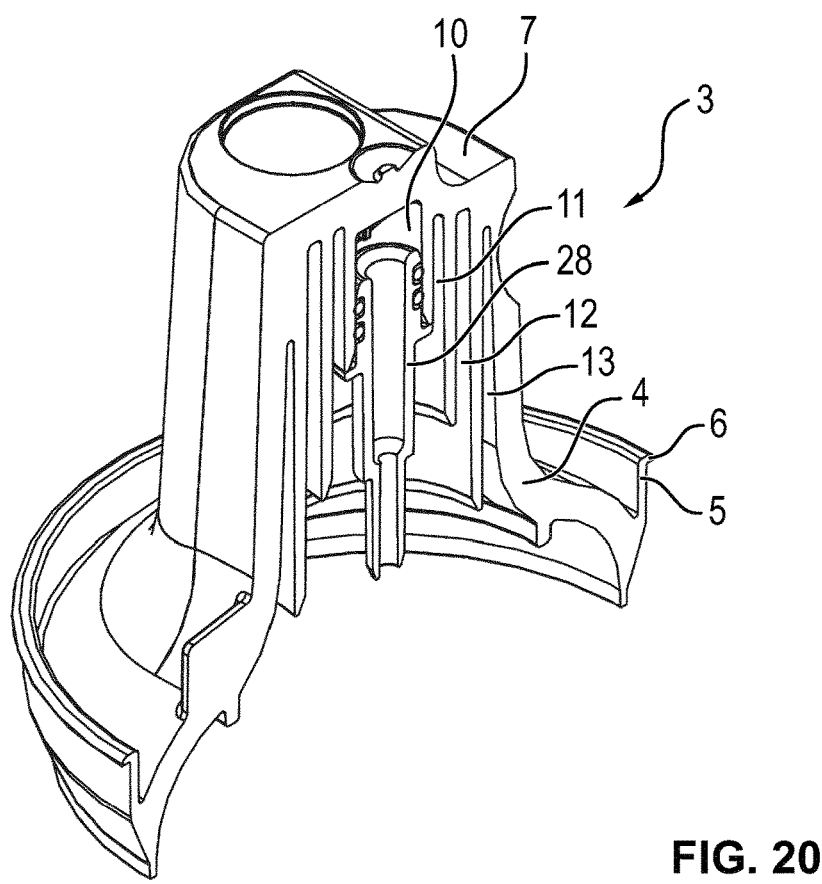
FIG. 20 is a third perspective cross-sectional view of the first cap-shaped housing part in the third configuration.
Figure 21:
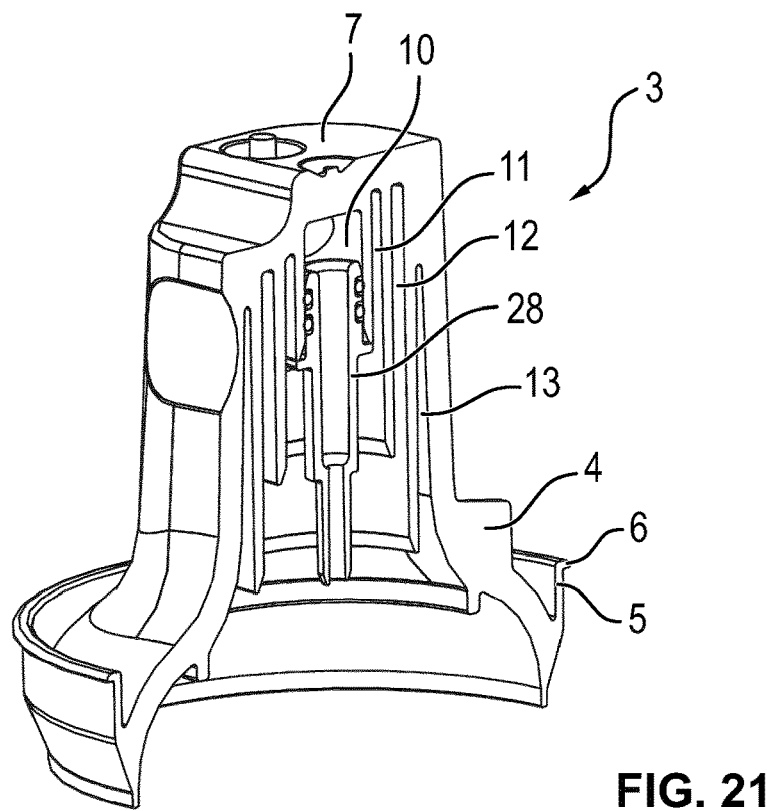
FIG. 21 is a fourth perspective cross-sectional view of the first cap-shaped housing part in the third configuration.
Figure 22:
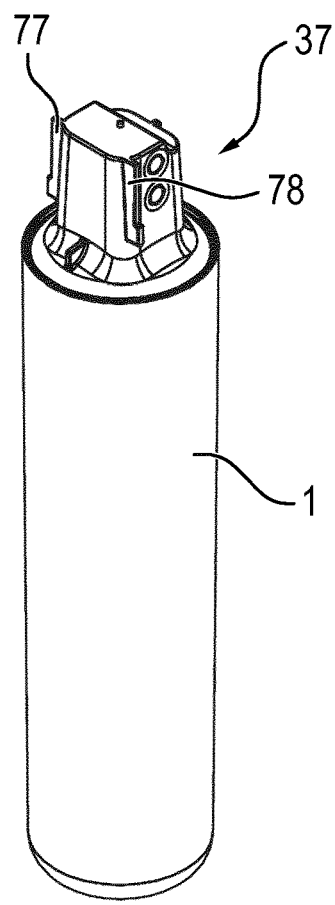
FIG. 22 is a perspective view of a liquid treatment cartridge with a second cap-shaped housing part.
Figure 23:
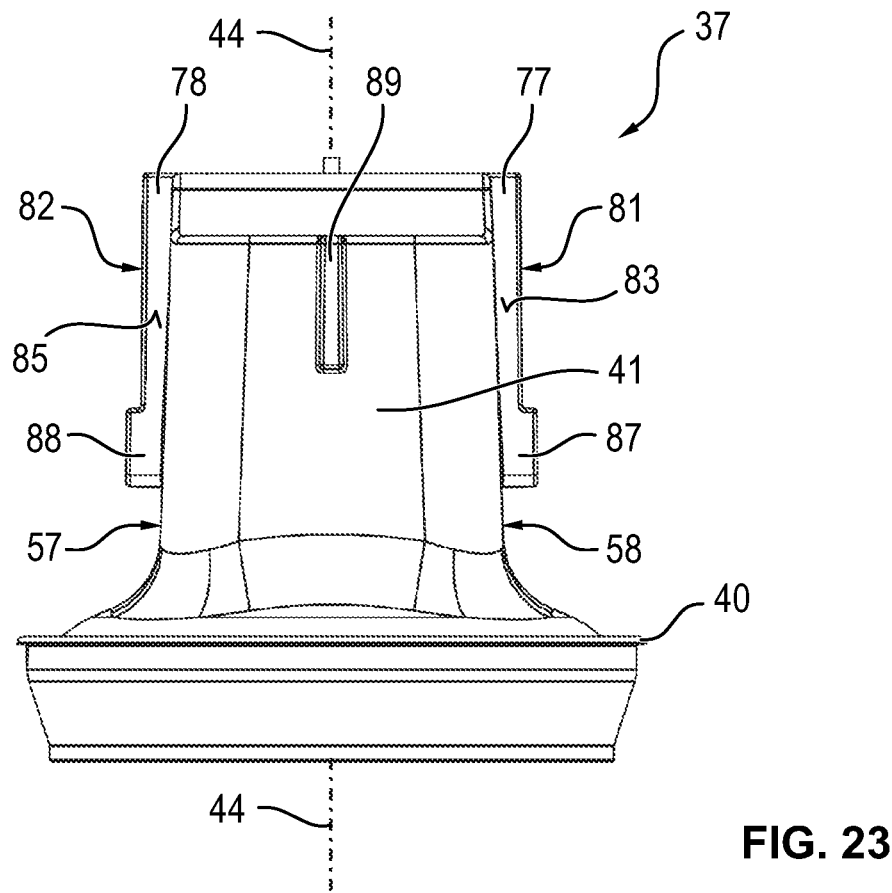
FIG. 23 is a plan view of a first side of the second cap-shaped housing part.
Figure 24:
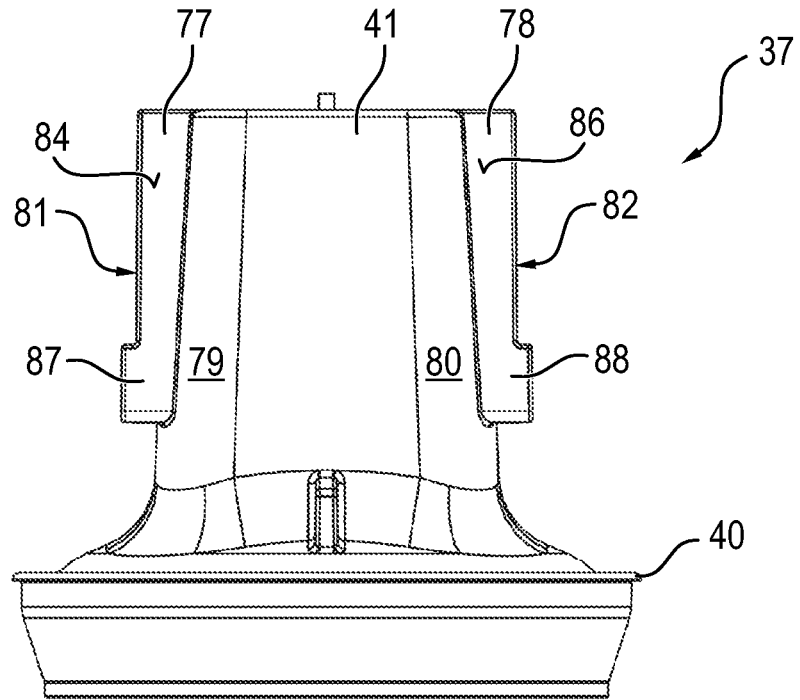
FIG. 24 is a plan view of a second side of the second cap-shaped housing part.
Figure 25:
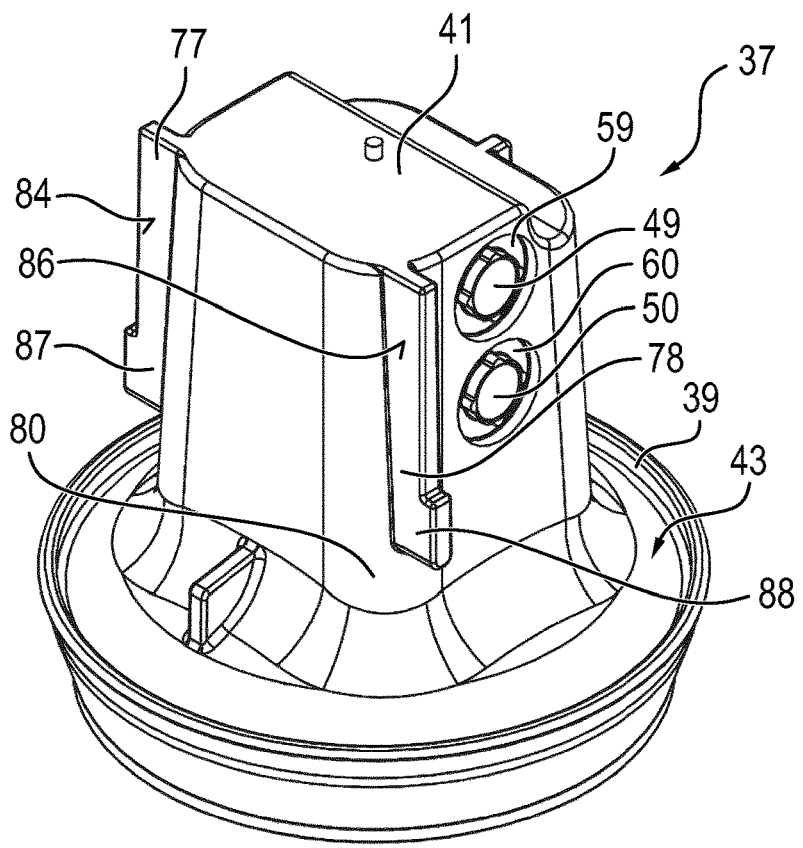
FIG. 25 is a perspective view of the second cap-shaped housing part.
Figure 26:
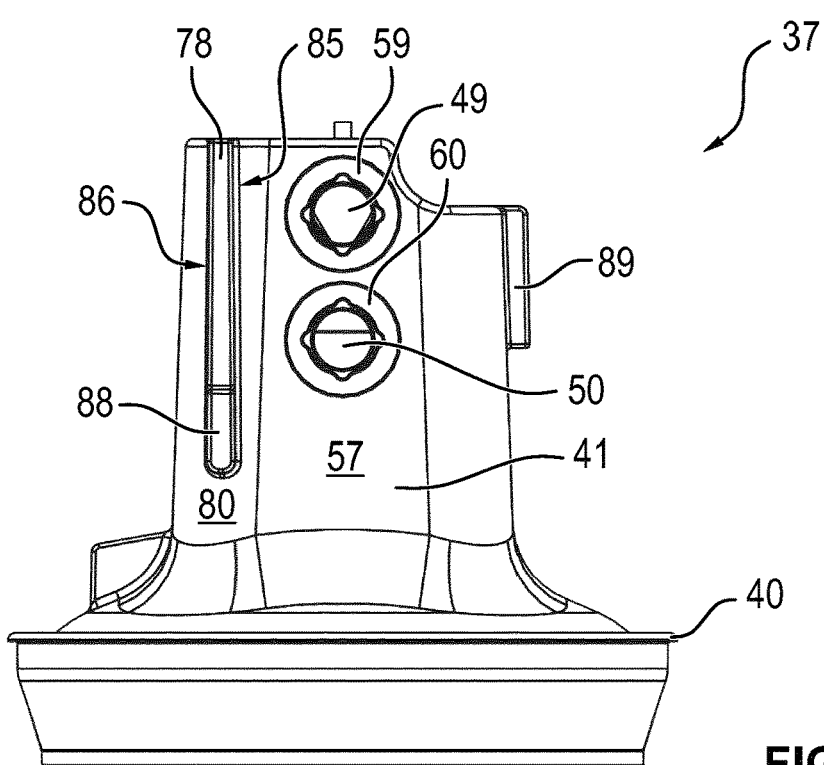
FIG. 26 is a plan view of a third side of the second cap-shaped housing part.

The second flow conductor part 29 and third flow conductor part 30 are likewise provided with such flanges 33,34 and sealing rings 35a,b,36 a,b (cf. FIGS. 9,13).

The first to third flow conductor parts 28-30 illustrate the basic structure of the ends of flow conductor parts to be plugged into the interior end sections 18-20. Generally, flow conductor parts of similar structure will be comprised in a more complicated assembly. Some examples will be discussed with reference to FIGS. 36-39, in which the first cap-shaped housing part 3 has been omitted for clarity and the flow conductor parts are illustrated only schematically.

Prior to that, a second cap-shaped housing part 37 (FIGS. 21-33) is discussed. The second cap-shaped housing part 37 comprises a body 38 obtainable by moulding, e.g. injection-moulding, and will generally be made of plastic, e.g. polypropylene.

The body 38 is partially inserted into the open end of the beaker-shaped housing part 1 to increase the contact area. The joint may be a joint obtainable by welding, e.g. ultrasonic welding, soldering or adhesive bonding, for example. An upstanding surrounding ridge 39, in the example with a flange 40, aids in providing the joint. The flange 40 determines the correct insertion of the body 38. The ridge provides a radially inner surface against which a tool can be placed, e.g. an anvil or sonotrode in case of ultrasonic welding or a tool for exerting a pressing force in case of adhesive bonding.

Figure 34:
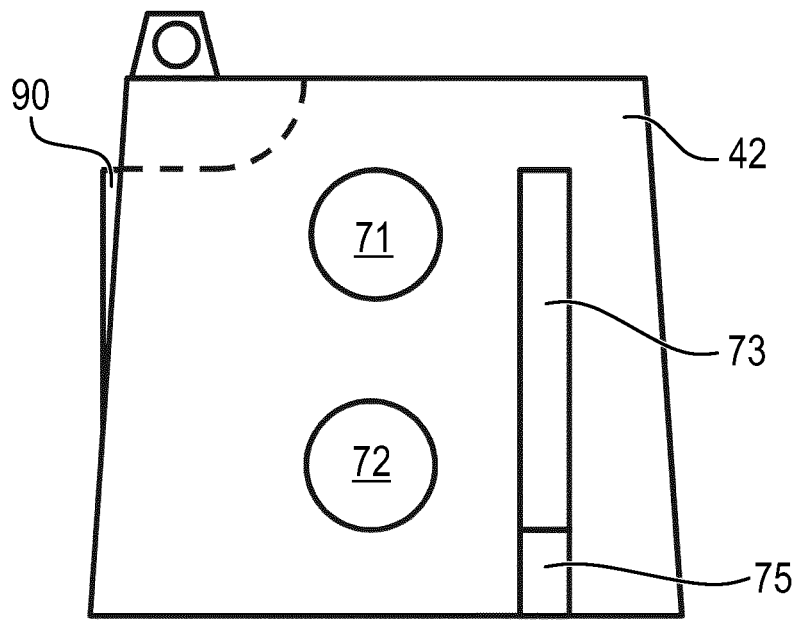
FIG. 34 is a first schematic side view of a receiving part of a header part for receiving a liquid treatment cartridge with the second cap-shaped housing part.
Figure 35:
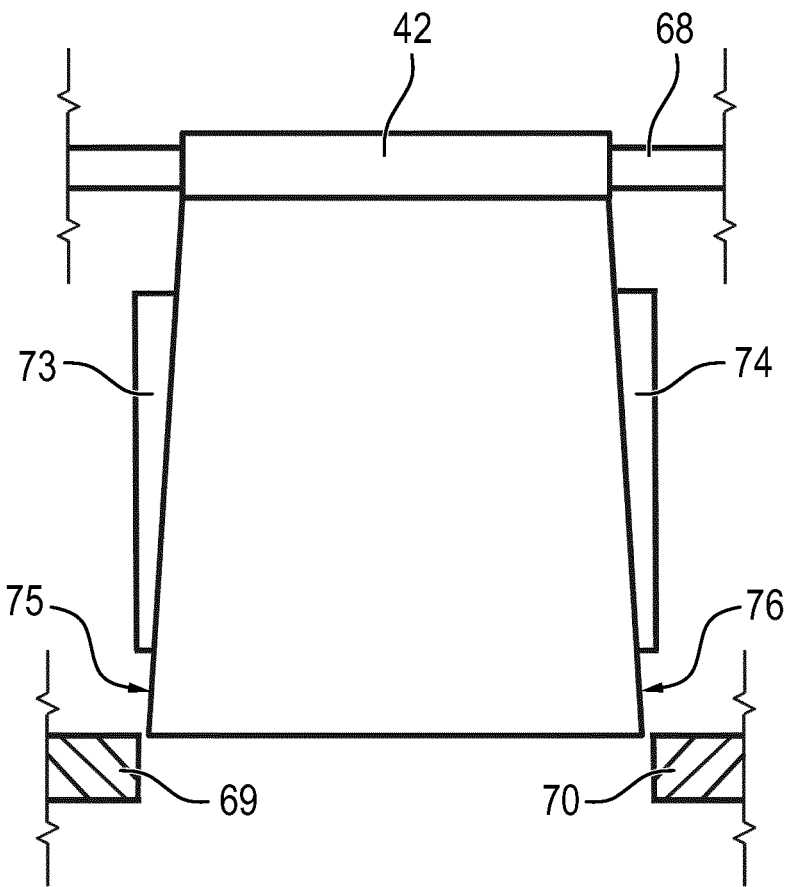
FIG. 35 is a second schematic side view of the receiving part of FIG. 34.
Figure 36:
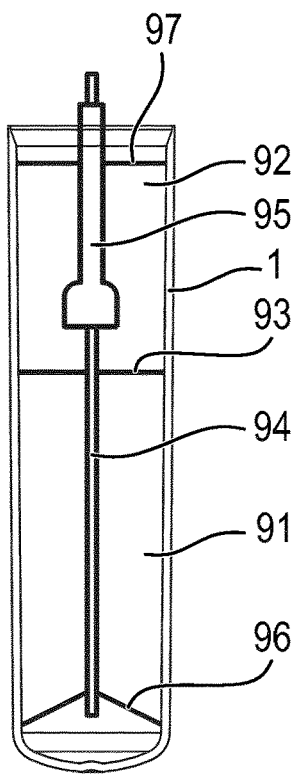
FIG. 36 is a schematic diagram illustrating liquid treatment and flow conductor parts of a liquid treatment cartridge including the first or the second cap-shaped housing part in a first configuration.
Figure 37:
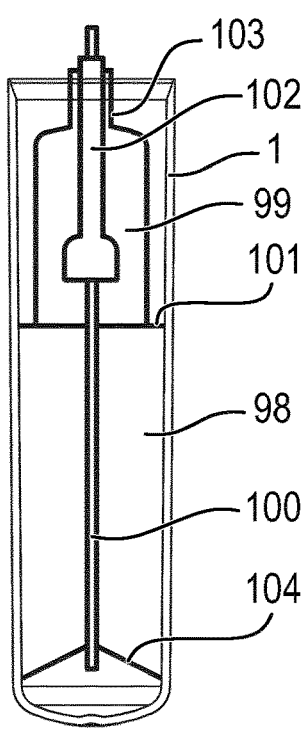
FIG. 37 is a schematic diagram illustrating liquid treatment and flow conductor parts of the liquid treatment cartridge in a second configuration.
Figure 38:
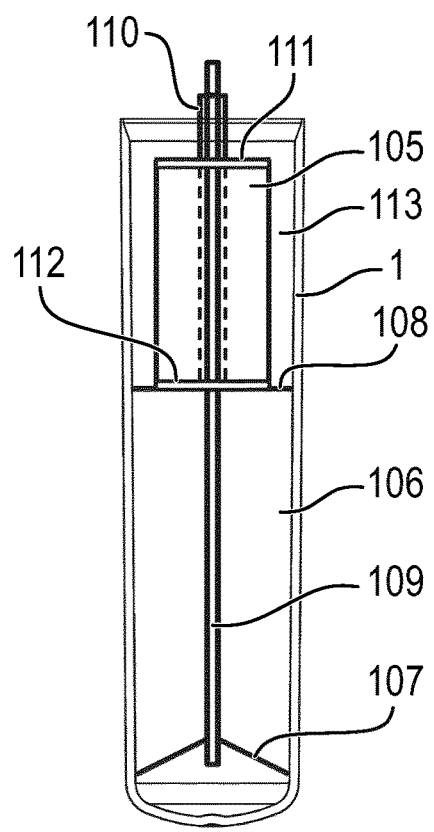
FIG. 38 is a schematic diagram illustrating liquid treatment and flow conductor parts of the liquid treatment cartridge in a third configuration.
Figure 39:
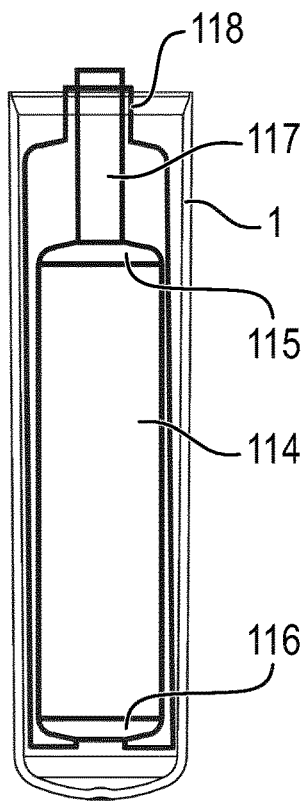
FIG. 39 is a schematic diagram illustrating liquid treatment and flow conductor parts of the liquid treatment cartridge in a fourth configuration.

The housing part body 38 includes a connecting head 41 for insertion in axial direction into a cavity defined by a receiving part 42 (FIGS. 34,35) movably journalled within a head part (not shown) of a liquid treatment system of which the liquid treatment cartridge forms a replaceable component.

The connecting head 41 projects in axial direction with respect to a remainder of the body 38, in particular a surrounding surface section 43 (FIG. 25) facing predominantly in axial direction. A reference axis 44 (FIG. 23) is aligned with the direction of insertion and corresponds to a body axis of at least the connecting head 41.

Formed in the connecting head 41 are first to fourth channels 45-48 each with a respective port 49-52 at an end thereof and each with an interior end section 53-56. End sections of the channels 45-48 at the other ends of the channels 45-48 to the interior end sections 53-56 are essentially straight and directed radially. This simplifies the tooling for moulding the body 38 of the cap-shaped housing part 37.

The interior end sections 53-56 are arranged concentrically, centred on the central axis. At least the central three channel end sections 53-55 are directed essentially axially into the interior of the cartridge housing. The ends of the first to third channels 45-47 at which the interior end sections 53-55 are provided each terminate at a different respective axial position, so that these interior ends are provided within at least one of the other channels, namely the surrounding channels. As a result, the second to fourth channels 46-48 include at least a section that is ring-shaped. Furthermore, liquid can mingle at these interior ends unless they are separated by separate flow conductor parts, as will be explained below.

Figure 27:
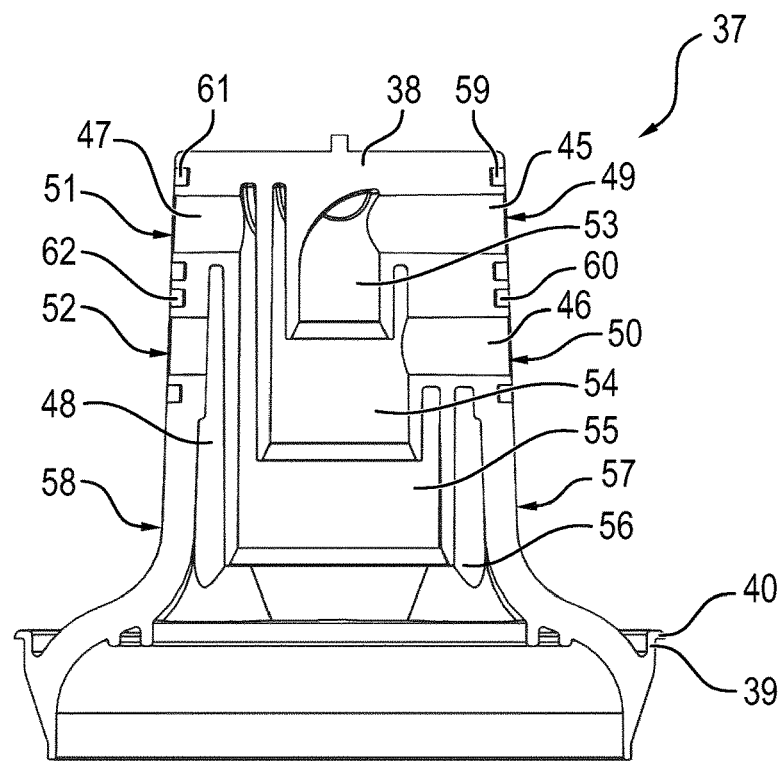
FIG. 27 is a plan cross-sectional view of the second cap-shaped housing part.
Figure 28:
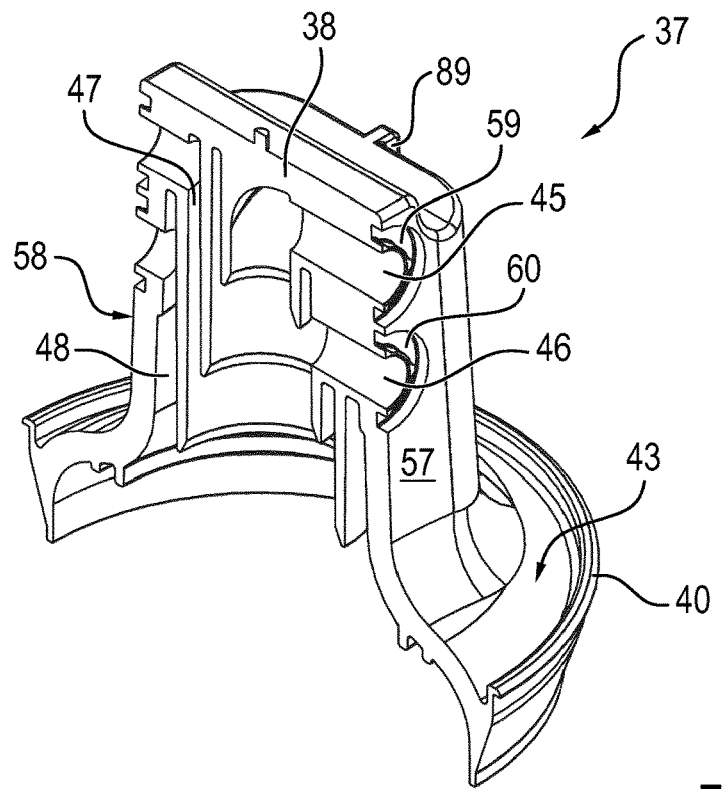
FIG. 28 is a first perspective cross-sectional view of the second cap-shaped housing part.
Figure 29:
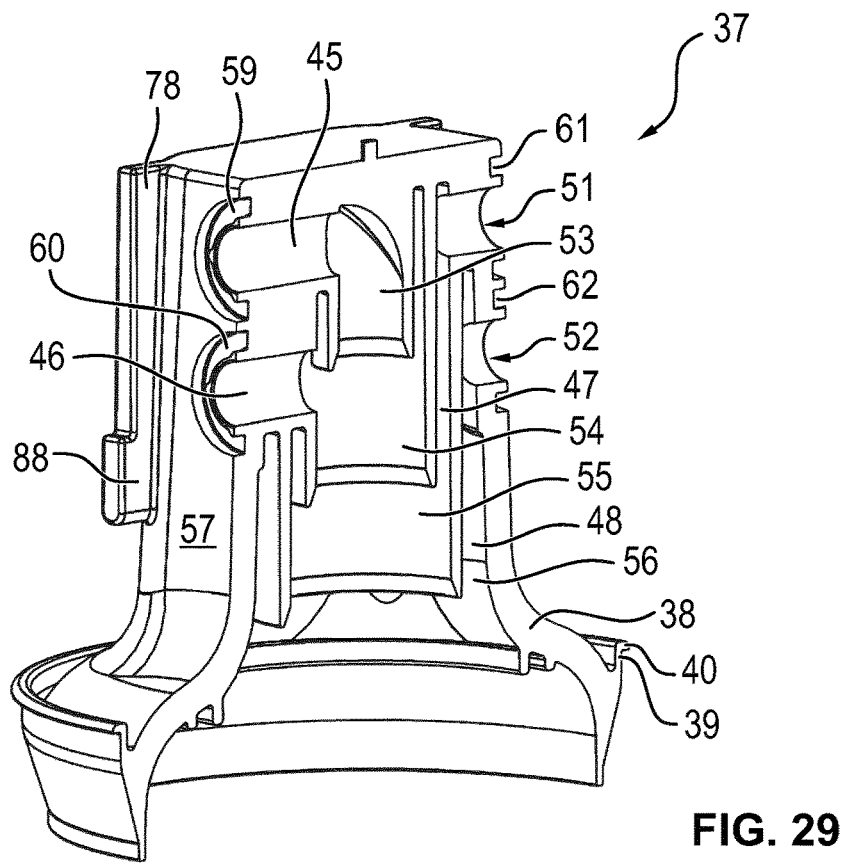
FIG. 29 is a second perspective cross-sectional view of the second cap-shaped housing part.
Figure 30:
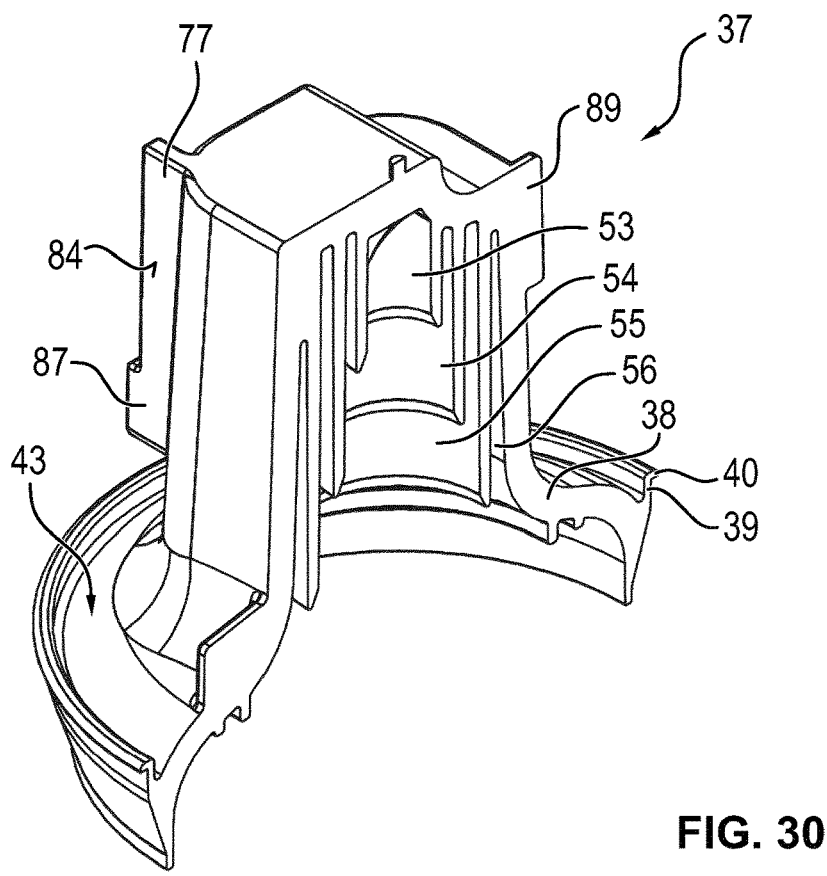
FIG. 30 is a third perspective cross-sectional view of the second cap-shaped housing part.
Figure 31:
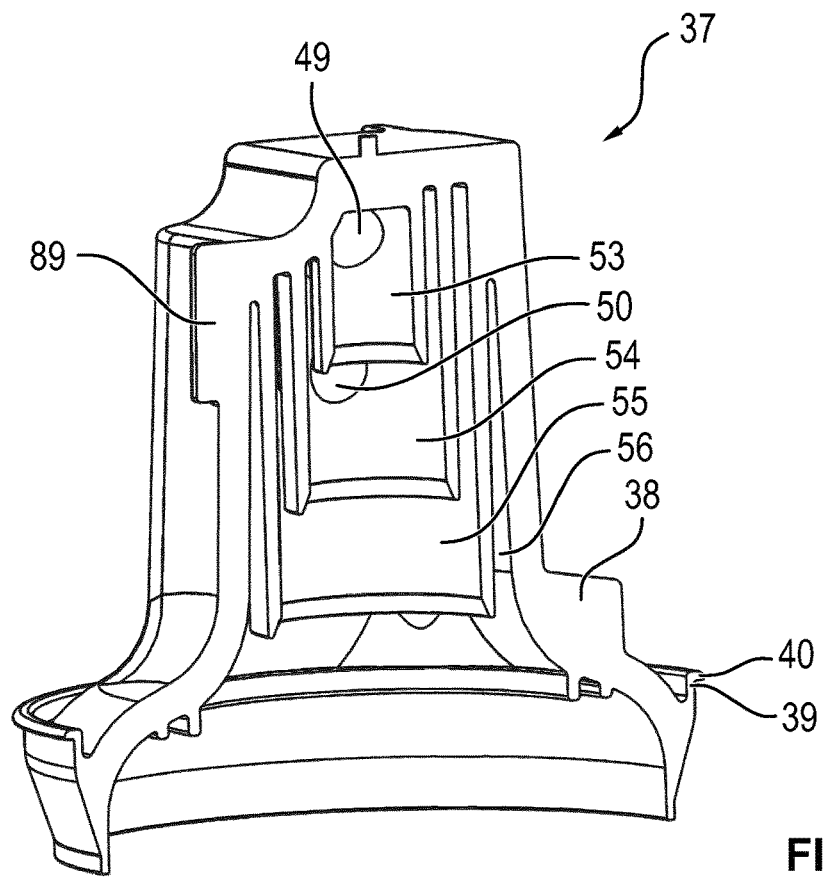
FIG. 31 is a fourth perspective cross-sectional view of the second cap-shaped housing part.

The ports 49-52 are provided in pairs of inclined, in this example essentially planar, surface sections 57,58 (FIG. 27)

on opposite sides of the connecting head 41. These surface sections 57,58 are inclined with respect to the reference axis 44, but face in a predominantly transverse direction, such that the connecting head 41 tapers slightly. The angles between the planes of the surface sections 57,58 and the central axis are therefore acute and the angles between the normals to the surface sections 57,58 and the central axis are obtuse. The ports 49-52 are surrounded by grooves 59-62 in which sealing rings (not shown) can be retained. It is noted that the first and second inclined surface sections 57,58 may have a slight curvature, but the grooves 59-62 will generally position identical sealing rings essentially in planes to ensure uniform compression and thus sealing.

One or more flow conductors parts forming a set selected from a range of different sets of flow conductor parts are configured to be plugged into the first, second and third interior end sections 53-55, respectively. Each flow conductor part plugged into an interior end section 53-55 includes a conduit for conducting liquid through at least part of the interior of the cartridge housing so as to separate interior ends of at least two of the channels 45-48 from at least one other, e.g. all, of the remaining channels 45-48. At their ends opposite the ends that are plugged in, these flow conductor parts may be connected to further flow conductor parts or liquid treatment components to form an assembly. Thus, a flow conductor part plugged into the first interior end section 53 would separate the interior ends of the second and third channels 46,47 from that of the first channel 45. A flow conductor part plugged into the second interior end section 54 would separate the interior ends of the first and second channels 45,46 from those of the third and fourth channels 47,48. A flow conductor part plugged into the third interior end section 55 would separate the interior end of the first, second and third channels 45-47 from that of the one remaining channel, namely the fourth channel 48. It is noted that, in alternative embodiments, separation may only be achieved by an assembly of multiple flow conductor parts.

In one illustrated configuration (FIGS. 32, 33), a first flow conductor part 63 is plugged into the second interior end section 54. The first flow conductor part 63 includes a section having an outer diameter corresponding essentially to the inner diameter of the interior end section 54 of the second channel 46. This section ends at a flange 64 for engaging a wall of the interior end section 54 to determine the extent to which the first flow conductor part 63 is insertable. This section is provided with two sealing rings 65a,b providing for sealing between the first flow conductor part 63 and the wall of the interior end section 54. They also provide a friction-fit sufficient to hold the first flow conductor part 63 in position.

Figure 32:
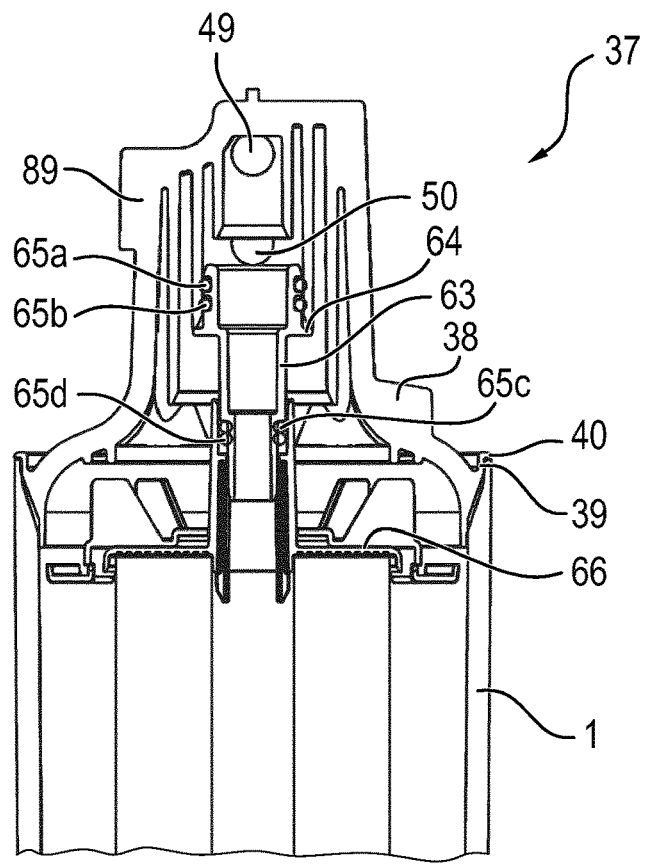
FIG. 32 is a plan cross-sectional view of a part of the liquid treatment cartridge with the second cap-shaped housing part in a configuration including a radial-flow liquid treatment part.
Figure 33:
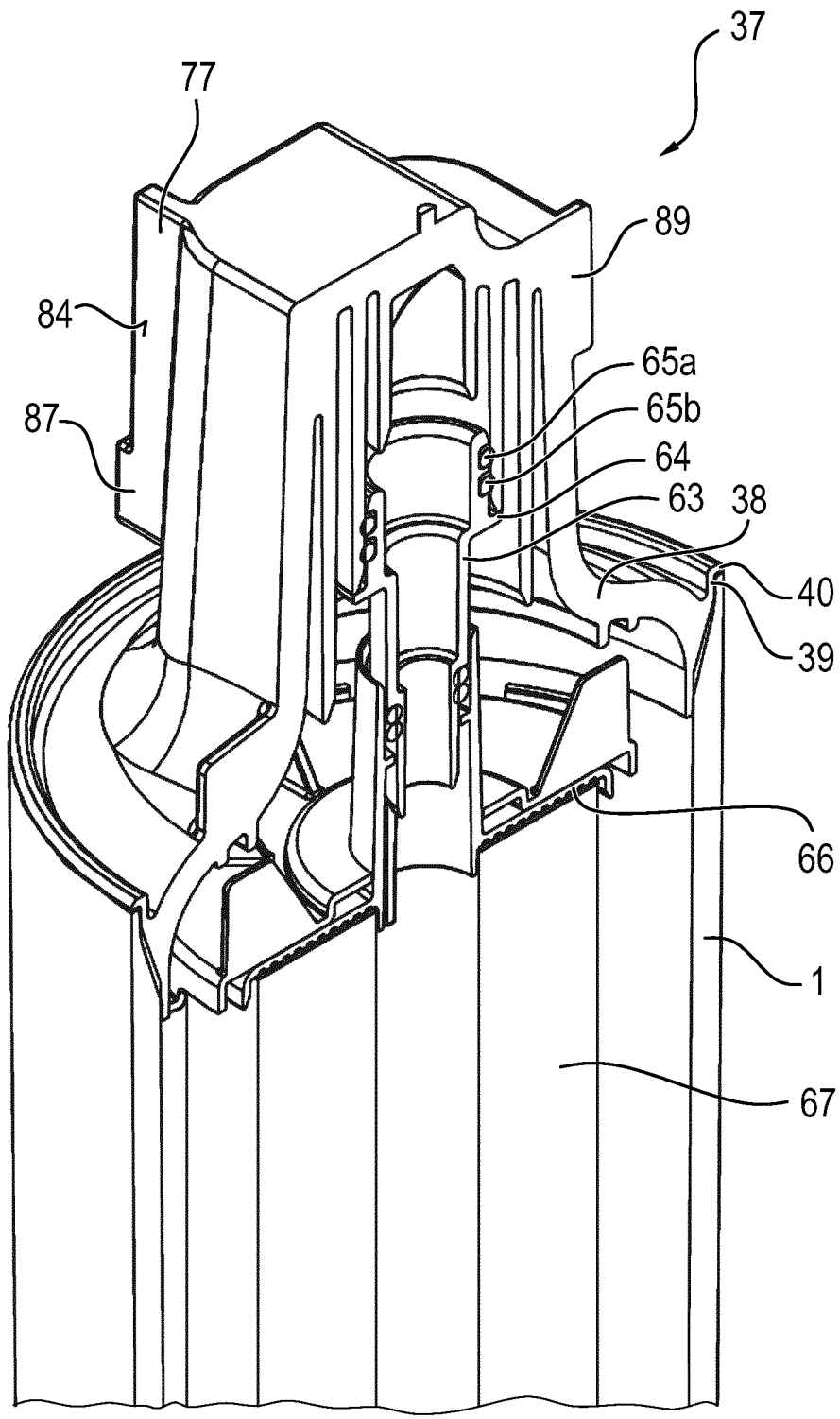
FIG. 33 is a perspective cross-sectional view of part of the liquid treatment cartridge in the configuration of FIG. 32.

In the configuration of FIGS. 32 and 33, an opposite axial end of the first flow conductor part 63 is plugged into an end cap 66 secured in a sealed manner to an axial end of a filter block 67. To this end, two further sealing rings 65c,d provide for sealing between the first flow conductor part 63 and the inside surface of a projecting cylindrical conduit forming part of the end cap 66.

The filter block 67 forms a hollow, liquid-permeable liquid treatment component. Together with the end cap 66 and a similar end cap (not shown) closing off the opposite axial end of the filter block 67, the first flow conductor part 63 is arranged to conduct liquid radially through the filter block 67. Generally, the direction of flow will be radially inwards. As a consequence, the third and fourth ports 51,52 will form liquid inlet ports and the first and second ports 49,50 will form liquid outlet ports. The cap-shaped housing part 37 in the illustrated configuration is thus part of a high-throughput liquid treatment cartridge. The first and second channels 45,46 are in direct fluid communication with each other. The third and fourth channels 47,48 are likewise in direct fluid communication with each other.

The filter block 67 will generally be formed of thermally bonded liquid treatment material. The liquid treatment material is granular, fibrous or a mixture of the two, as is the binder. Particulate binder has the effect of providing point-bonding, especially if the filter block is obtained by heating the mix of binder particles and liquid treatment material without much compression. Suitable binder material is ultra-high density polyethylene, for example. The liquid treatment material includes liquid treatment material for the treatment of liquid by means of a diffusive process, e.g. at least one of sorption, elution and ion exchange. In a useful embodiment, the liquid treatment material includes activated carbon.

The receiving part 42 (FIGS. 34 and 35) into which the connecting head 41 is arranged to be inserted is journalled for rotation about a spindle 68 with respect to housing of the head part. Only two ledges 69,70 (FIG. 35) of the housing are shown. The receiving part 42 is provided with ports 71,72 in walls thereof. When inserted, the sealing elements provided in the grooves 59-62 of the connecting head 41 seal against an inside surface of the walls of the receiving part 42, such that a sealed connection is provided between the ports 71,72 of the receiving part 42 and those of the connecting head 41. Flexible conduits (not shown) are connectable to the ports 71,72 of the receiving part 42 on the outside, for example, so that liquid to be treated and treated liquid can be provided to and received from the liquid treatment cartridge.

At least inside surfaces of the side walls of the receiving part 42 are inclined in the same manner as the first and second inclined surface sections 57,58 of the connecting head 41.

The receiving part 42 includes groove-defining sections 73,74 that protrude outwards from the inclined side walls to define grooves on the inside of the cavity defined by the receiving part 42. Slots 75,76 are defined between an edge of the receiving part 42 at the opening of the cavity and an end of the grooves.

The connecting head 41 is provided with ridges 77,78 on an external surface for insertion into the grooves defined by the groove-defining sections 73,74 when the connecting head 41 is inserted in axial direction into the cavity defined by the receiving part 42.

Surface sections 79,80 on which the ridges 77,78 are provided are inclined with respect to the axis such that the connecting head 41 tapers towards the axial end of the cartridge housing. However, an elevation of the ridge 77,78 with respect to the surface section 79,80 increases in axial direction towards the free axial end of the connecting head 41. As a consequence, outward-facing surface sections 81,82 (FIGS. 23,24) closest in axial direction to the axial end of the connecting head 41 forming the axial end of the cartridge housing are substantially parallel to the axis. The ridges 77,78 can fulfil their alignment role as soon as their axially leading ends enter the grooves defined by the groove-defining sections 73,74.

At least an axially leading section of each ridge 77,78 has parallel opposing surfaces 83-86 (FIGS. 23-26) extending in axial direction and in a direction of elevation from the surface section 79,80 on which the ridge 77,78 is provided. These contact opposing surfaces of the grooves at multiple axial locations when the ridges 77,78 are inserted into the grooves defined by the groove-defining sections 73,74.

Trailing axial end sections 87,88 serve to retain the liquid treatment cartridge in the head part of the liquid treatment system. They are provided with a rounded shape to facilitate movement whilst engaging the ledges 69,70 when the receiving part 42 is moved with respect to the housing in which it is arranged. Such movement is only possible once the connecting head 41 has been inserted sufficiently far into the receiving part 42 in axial direction. The trailing axial end sections 87,88 have an increased elevation with respect to the surface sections 79,80 on which the ridges 77,78 are provided, such that they are not able to enter the grooves defined by the groove-defining sections 73,74. In fact, they are stepped with respect to the outward-facing, axially adjacent, surface sections 81,82. They are able to enter the slots 75,76, however, and thus function as stops determining the limit of axial movement in the direction of insertion.

It is noted that the two ridges 77,78 provided on opposite sides of the connecting head 41 adjacent axially oriented rows of ports 49-52 are the principal alignment parts. However, in the illustrated embodiment, a relatively short third ridge 89 is provided that co-operates with a groove defined by a third groove-defining section 90 open towards the cavity defined by the receiving part 42. This third ridge 89 could be omitted in an alternative embodiment. Having explained the general structure of the connecting heads 7,41 some examples of cartridge configurations achievable by configuring the combination of connecting head 7,41 and beaker-shaped housing part 1 through the selection of appropriate flow conductor parts will be given. These illustrate how it is possible to provide a range of liquid treatment cartridges differing in terms of the type of treatment they are arranged to carry out and optionally also in terms of the number of inlet and outlet ports.

In a first configuration of the liquid treatment cartridge (FIG. 36) first and second beds 91,92 of liquid treatment material are provided, separated by a liquid-permeable divider part 93. A down tube 94 extends through the first and second beds 91,92. One axial end of the down tube 94 is configured, e.g. in the manner of the first flow conductor part 28, for plugging into the first channel 10,45 or for plugging into the second channel 11,46. A concentric flow conductor 95 has an axial end configured, e.g. in the manner of the second flow conductor part 29 or third flow conductor part 30, for plugging into the second or third channel 11,12,46,47 depending on which channel the down tube 94 is plugged into. The concentric flow conductor 95 extends to an axial location separated from the cap-shaped housing part 3,37 by a section of only the second bed 92. The walls of the down tube 94 and the concentric flow conductor 95 are essentially impervious to liquid. A ring channel is formed between the inside of the concentric flow conductor 95 and the down tube 94. The flow of liquid through this ring channel bypasses the first bed 91.

In an embodiment, the first bed 91 includes essentially loose granular liquid treatment material for the treatment of liquid by ion exchange, e.g. a weakly acidic cation exchange resin in the hydrogen form. It may further include a smaller amount of weakly acidic cation exchange resin in the sodium or potassium form. It may also include a further sorbent, e.g. activated carbon. The second bed 92 may include only such a sorbent. The flow of liquid treated in the first bed 91 mixes with the flow of liquid bypassing the first bed 91 in the second bed 92. It leaves the liquid treatment cartridge through the third and fourth ports 16,17,51,52 assuming the down tube 94 is plugged into the first channel 10,45 and the concentric flow conductor 95 is plugged into the second channel 11,46. The down tube 94 separates the interior end of the first channel 10,45 from the interior ends of the other channels 11-13,46-48, including the second channel 11,46 in particular. Thus, the flow of liquid through the first port 14,49 does not mix with that through the second port 15 until after treatment in the first bed 91. The volumetric flow rate ratio between the two flows determines the composition of the liquid that is provided through the third and fourth ports 16,17,51,52.

A first liquid-permeable screen 96 is provided between the first bed 91 and the axial end of the down tube 94, in order to provide a more uniform axial flow pattern through the first bed 91 and prevent the down tube 94 from being obstructed. A second liquid-permeable screen 97 retains the material of the second bed 92 within the liquid treatment cartridge by mechanically filtering the treated liquid. It may further contribute to preventing channelling in at least the second bed 92. The divider part 93 may fulfil a similar function with respect to the first bed 91.

A second configuration of the liquid treatment cartridge (FIG. 37) also includes a first bed 98 and a second bed 99 of liquid treatment material, a central down tube 100 and a liquid-permeable divider part 101. It includes a first concentric flow conductor 102 and a second concentric flow conductor 103.

The down tube 100 extends through the first and second beds 98,99. One axial end of the down tube 100 is configured for plugging into the first channel 10,45 provided in the cap-shaped housing part 3,37. The first concentric flow conductor 102 has an axial end configured for plugging into the second channel 11,46. The first concentric flow conductor 102 extends to an axial location separated from the cap-shaped housing part 3,37 by a section of only the second of the first and second beds 91,99. The second concentric flow conductor 103 has an axial end configured for plugging into the third channel 12,47.

As in the first configuration, a first liquid-permeable screen 104 is provided between the axial end of the down tube 100 distal to the cap-shaped housing part 3,37 and the axial end of the first bed 98. The liquid-permeable divider part 101 holds the material of the first bed 98 captive between it and the first liquid-permeable screen 104. Similar screens (not shown) may be provided at the axial end of the first concentric flow conductor 102 distal to the cap-shaped housing part 3,37 and between the first and second concentric flow conductors 102,103 at an axial end proximal to the cap-shaped housing part 3,37. This keeps the granular material of the second bed 99 in place and treated liquid free of the material.

The second configuration makes it possible to provide liquid treated only in the first bed 98 through the fourth port 17,52. A mix of liquid treated in the first bed 98 and the second bed 99 is provided through the third port 16,51.

In a variant of this configuration, the direction of flow is reversed. The fourth port 17,52 functions as a single inlet port. The down tube 100 functions as a riser tube. Liquid exiting through the first port 14,49 is treated only in the first bed 98. Liquid exiting through the third port 16,51 is treated in the first bed 98 and the second bed 99. Liquid exiting through the second port 15,50 is treated in the first bed 98 and in the second bed 99, but to a lesser extent than the liquid that exits through the third port 16,51. In an example, the first bed 91 includes cation exchange resin in the hydrogen form for reducing carbonate hardness and the second bed 99 includes at least anion exchange resin in the hydroxyl form. This variant, when used to treat drinking water, would thus produce three compositions with reduced carbonate hardness, each with a different total mineral content.

A third configuration (FIG. 38) is similar to the first configuration, except that it includes a hollow liquid treatment component 105 through which liquid is arranged to flow in a radial direction. The hollow liquid treatment component 105 is combined with a bed 106 of granular liquid treatment material arranged between a liquid-permeable screen 107 and a liquid-permeable divider part 108.

The composition of the bed 106 corresponds to that of the first beds 91,98 of the first and second configurations.

A central down tube 109 is plugged into the first channel 10,45, at the end of which the first port 14,49 is provided. The first port 14,49 functions as a first inlet port. A concentric flow conductor part 110 is plugged into the interior end section 19,54 of the second channel 11,46. The second port 15,50 also functions as inlet port. The concentric flow conductor part 110 is plugged into a first end cap 111 secured in a sealed manner to an axial end of the hollow liquid-treatment component 105. A second end cap 112 is secured to an opposite axial end of the hollow liquid treatment component 105. It seals off the axial end face of the hollow liquid treatment component 105, allowing only the down tube 109 to pass through.

The hollow liquid-treatment component 105 includes a porous liquid-permeable body. This body may be made of thermally bonded liquid treatment material, for example. It may similar in composition to the filter block 67 described above.

Liquid treated in the bed 106 of liquid treatment material mixes with liquid flowing out of the hollow liquid treatment component 105 in radial direction in a surrounding space 113. The surrounding space 113 may be empty or contain a further bed of liquid treatment material. The mix of treated liquid leaves the liquid treatment cartridge through the third and fourth ports 16,51,17,52.

A fourth liquid treatment cartridge configuration (FIG. 39) is a membrane filtration cartridge, e.g. for reverse osmosis or ultrafiltration. It includes, for example, a hollow fibre membrane module 114 comprising hollow fibres (not shown individually) potted into end sections 115,116.

A first flow conductor part 117 is plugged into the interior end section 19,54 of the second channel 11,46. There is no flow conductor part plugged into the first channel 10,45, so that the interior ends of the first and second channels 10,45,11,46 are in direct fluid communication. The first and second ports 14,15,49,50 both function as inlet ports. The first flow conductor part 117 is sealingly plugged into a membrane module end section 115 to conduct raw liquid into the hollow fibres.

The membrane module 114 is operated in cross-flow mode. Filtrate flows radially outwards into a space defined within a second flow conductor part 118. The second flow conductor part 118 will generally be an assembly of flow conductor parts, not shown individually here for simplicity. The second flow conductor part 118 is plugged into the interior end section 20,55 of the third channel 12,47. Since the third channel 12,47 is separated from the first and second channels 10,46,45,46 by the first flow conductor part 117 and from the fourth channel 13,48 by the second flow conductor part 118, filtrate leaves the liquid treatment cartridge only through the third port 16,51.

Retentate leaves the membrane module 114 through the other membrane module end section 116, to which the second flow conductor part 118 is sealingly connected. The retentate can thus only flow between the second flow conductor part 118 and the wall of the beaker-shaped housing part 1 to reach the fourth channel 13,48. The fourth port 17,52 functions as outlet port for retentate.

Because the first and the second ports 14,15,49,50 both function as inlet ports, there is a relatively small pressure drop within the connecting head 7,41, without having to take recourse to inlet ports with an elongated cross-sectional shape or to larger connecting heads 7,41. The same cap-shaped housing part 3,37, in particular the same housing part body 4,38, can be used to manufacture any of the cartridge configurations illustrated.

The invention is not limited to the embodiments described above, which may be varied within the scope of the accompanying claims. For example, it is possible to reverse the direction of flow in the third configuration (FIG. 38) by having the down tube 109 extend only from the second end cap 112 to the liquid-permeable screen 107, so that the interior ends of the first and second channels 10,11,45,46 are in direct fluid communication with each other. Mixing of liquid treated in the bed 106 of liquid treatment material with liquid treated when flowing radially inwards through the hollow liquid treatment component 105 will then take place in the core of the hollow liquid treatment component 105.

The liquid treatment systems and liquid treatment cartridges described herein are adapted for treating aqueous liquids, e.g. drinking water. In particular, the head part will generally be arranged to be connected more or less permanently to a pressurised source of liquid, such as the mains water supply. Where the treated liquid is drinking water, the head part is adapted to supply it to appliances such as beverage machines, dishwashers, steam cookers and the like. The head part is provided with fittings for connection to conduits leading to such appliances. It is disconnected from at least the source of water relatively infrequently, if at all. The liquid treatment cartridges are replaceable relatively frequently and easily. A manufacture can configure them to provide a low pressure drop or liquids of different or varying compositions, according to demand.

LIST OF REFERENCE NUMERALS

1—beaker-shaped housing part
2—central axis
3—first cap-shaped housing part
4—body of first housing part
5—surrounding ridge
6—flange
7—connecting head
8—recess in connecting head
9—surface section surrounding the connecting head
10—first channel
11—second channel
12—third channel
13—fourth channel
14—first port
15—second port
16—third port
17—fourth port
18—interior end section of first channel
19—interior end section of second channel
20—interior end section of third channel
21—interior end section of fourth channel
22—first inclined surface section
23—second inclined surface section
24—first groove
25—second groove
26—third groove 27—fourth groove
28—first flow conductor part
29—second flow conductor part
30—third flow conductor part
31—flange of first flow conductor part
32a,b—sealing rings on first flow conductor part
33—flange of second flow conductor part
34—flange of third flow conductor part
35a,b—sealing rings on second flow conductor part
36a,b—sealing rings on third flow conductor part
37—second cap-shaped housing part
38—body of second housing part
39—surrounding ridge
40—flange
41—second connecting head
42—receiving part
43—surface section surrounding connecting head
44—reference axis
45—first channel
46—second channel
47—third channel
48—fourth channel
49—first port
50—second port
51—third port
52—fourth port
53—interior end section of first channel
54—interior end section of second channel
55—interior end section of third channel
56—interior end section of fourth channel
57—first inclined surface section
58—second inclined surface section
59—first groove
60—second groove
61—third groove
62—fourth groove
63—first flow conductor part
64—flange of first flow conductor part
65a-d—sealing rings on first flow conductor part
66—end cap
67—filter block
68—spindle
69—left ledge
70—right ledge
71—upper port in receiving part
72—lower port in receiving part
73—left groove-defining section
74—right groove-defining section
75—left slot
76—right slot
77—left ridge
78—right ridge
79—surface section on which left ridge is provided
80—surface section on which right ridge is provided
81—left outward-facing surface section
82—right outward-facing surface section
83—front-facing parallel surface on left ridge
84—rear-facing parallel surface on left ridge
85—front-facing parallel surface on right ridge
86—rear-facing parallel surface on right ridge
87—trailing axial end section of left ridge
88—trailing axial end section of right ridge
89—third ridge
90—third groove-defining section
91—first bed
92—second bed
93—divider part
94—down tube
95—concentric flow conductor
96—first liquid-permeable screen
97—second liquid-permeable screen
98—first bed
99—second bed
100—down tube
101—divider part
102—first concentric flow conductor
103—second concentric flow conductor
104—liquid-permeable screen
105—hollow liquid treatment component
106—bed
107—liquid-permeable screen
108—divider part
109—down tube
110—concentric flow conductor part
111—first end cap
112—second end cap
113—surrounding space
114—membrane module
115—upper membrane module end section
116—lower membrane module end section
117—first flow conductor part
118—second flow conductor part

The invention claimed is:

1. A liquid treatment cartridge comprising:
a housing, the housing including a housing part forming an axial end of the housing and including a connecting head at the axial end of the housing,
wherein the connecting head includes at least three liquid ports, each at an end of a respective channel defined by the housing part,
wherein the connecting head is configured for insertion into a cavity of a head part of a liquid treatment system having liquid ports such that the liquid ports of the connecting head are in sealed liquid communication with respective liquid ports in the head part;
a liquid treatment part arranged in the housing, wherein the liquid treatment part comprises at least one component for treating a liquid; and
at least one separate flow conductor part on the inside of the housing, attached to the housing part and including at least one conduit for conducting liquid so as to separate interior ends of at least two of the channels from those of at least one other of the channel, wherein the at least three liquid ports at ends of respective channels defined by the housing part include at least a fourth liquid port.

2. The liquid treatment cartridge according to claim 1, wherein the housing part includes a single moulded body in which the liquid ports and channels are formed.

3. The liquid treatment cartridge according to claim 1, wherein at least one of the at least one flow conductor parts is plugged into an interior end of at least one of the channels.

4. The liquid treatment cartridge according to claim 1, wherein the housing includes a vessel, and
wherein the housing part forms a cap closing off the vessel at an axial end of the vessel.

5. The liquid treatment cartridge according to claim 1, wherein the connecting head projects in axial direction with respect to a remainder of the housing part.

6. The liquid treatment cartridge according to claim 1, wherein the at least one component for treating a liquid comprises a hollow, liquid-permeable liquid treatment component, and wherein at least one of the flow conductor parts is comprised in the liquid treatment part and arranged to conduct liquid radially through the liquid-permeable liquid treatment component.

7. The liquid treatment cartridge according to claim 1, wherein the liquid treatment part includes a bed of liquid treatment material, and
wherein at least one of the flow conductor parts includes a conduit for conducting liquid through the interior of the housing between the housing part and an axial location separated from the housing part by at least a section of the bed.

8. The liquid treatment cartridge according to claim 1, wherein the at least one flow conductor parts are arranged to separate interior ends of at least two of the channels from each other and from interior ends of at least a further one of the channels.

9. The liquid treatment cartridge according to claim 8, wherein the at least one flow conductor parts are arranged to separate the interior ends of the at least two channels from each other and from each of at least two other ones of the channels, and
wherein at least two of the at least two other channels are in direct fluid communication.

10. The liquid treatment cartridge according to claim 8, wherein the at least one flow conductor parts are arranged to separate interior ends of at least four of the channels from each other, and
wherein the liquid treatment cartridge includes at least one part for dividing a flow of liquid received through one of the four channels into at least two sub-flows conducted to different locations within the cartridge.

11. The liquid treatment cartridge according to claim 1, wherein the liquid treatment part comprises at least one compartment including at least a medium for treatment of liquid by ion exchange, and
wherein the liquid treatment cartridge is arranged to conduct at least one of a flow of liquid received through at least one of the liquid ports and a sub-flow of liquid obtained by dividing the flow of liquid into sub-flows through the interior of the housing so as to by-pass at least a section of the at least one compartment including at least the medium for treatment of liquid by ion exchange.

12. The liquid treatment cartridge according to claim 1, wherein the interior end of at least one of the channels is provided within at least one of the other channels.

13. The liquid treatment cartridge according to claim 12, wherein at least end sections at the interior ends of the channels are arranged concentrically.

14. The liquid treatment cartridge according to claim 1, wherein at least radially inner ones of the channels have interior ends directed essentially axially into the interior of the housing.

15. The liquid treatment cartridge according to claim 1, wherein a majority of the liquid ports are provided in surface sections of the connecting head facing in a direction at an angle to an axial direction of the housing.

16. The liquid treatment cartridge according to claim 15, wherein the surface sections are essentially planar.

17. The liquid treatment cartridge according to claim 15, wherein the surface sections are inclined with respect to the axis, such that the connecting head tapers towards the axial end of the housing.

18. A liquid treatment system including at least one head part and at least one replaceable liquid treatment cartridge according to claim 1.

19. A liquid treatment system including at least one head part and at least one replaceable liquid treatment cartridge according to claim 1.

20. The liquid treatment cartridge according to claim 1, wherein the separation between interior ends of at least two of the channels and those of at least one other of the channels is such that at least a sub-flow of liquid emerging from an interior end is carried away from the housing part and returns to an interior end separated from the interior end from which it has emerged after passing through the liquid treatment part arranged in the housing.

21. A liquid treatment cartridge including a housing, in which a liquid treatment part is arranged, the housing including a housing part forming an axial end of the housing and including a connecting head at the axial end of the housing,
wherein the liquid treatment part comprises at least one component for treating a liquid,
wherein the connecting head includes at least one liquid port and is configured for insertion into a cavity of a head part of a liquid treatment system such that the liquid port(s) of the connecting head are in sealed liquid communication with respective liquid ports in the head part,
wherein the connecting head is insertable in axial direction into a cavity of a receiving part of the head part movably journalled with respect to a housing of the head part, and
wherein the connecting head includes at least one alignment part for axially aligning the receiving part with the liquid treatment cartridge during insertion of the connecting head into the cavity,
the alignment part being provided on an external surface of the connecting head for insertion into a groove of the receiving part when the connecting head is inserted into the cavity,
wherein the alignment parts for insertion into the groove of the receiving part are arranged to contact the groove at multiple axial locations simultaneously.

22. The liquid treatment cartridge according to claim 21, wherein at least one of the alignment parts is a ridge on the external surface.

23. The liquid treatment cartridge according to claim 22, wherein the ridge is provided on a surface section of the connecting head inclined with respect to the axis, such that the connecting head tapers towards the axial end of the housing, and
wherein an elevation of at least a section of the ridge with respect to the surface section increases in axial direction towards the axial end of the housing.

24. The liquid treatment cartridge according to claim 22, wherein at least a section of the ridge has parallel opposing surfaces extending in axial direction and in a direction of elevation from a surface section on which the ridge is provided.

25. The liquid treatment cartridge according to claim 21, wherein at least one of the alignment parts is positioned adjacent a row of at least two liquid ports.

26. The liquid treatment cartridge according to claim 21, wherein the alignment parts are at least two in number.

27. The liquid treatment cartridge according to claim 21,
wherein the alignment part functions as a retaining part for retaining the liquid treatment cartridge in a position with the connecting head at least partly inserted into the head part.

28. The liquid treatment cartridge according to claim 27, wherein an axial end of the retaining part distal to the axial end of the housing has a rounded shape.

29. The liquid treatment cartridge according to claim 21,
wherein the connecting head includes at least four liquid ports, each at an end of a respective channel defined by the housing part, and
wherein the liquid treatment cartridge includes at least one separate flow conductor part on the inside of the housing, attached to the housing part and including at least one conduit for conducting liquid so as to separate interior ends of at least two of the channels from those of at least one other of the channels.

30. The liquid treatment cartridge according to claim 29, wherein the separation between interior ends of at least two of the channels and those of at least one other of the channels is such that at least a sub-flow of liquid emerging from an interior end is carried away from the housing part and returns to an interior end separated from the interior end from which it has emerged after passing through the liquid treatment part arranged in the housing.

31. A set of liquid treatment cartridges, each including:
a housing, the housing including a housing part forming an axial end of the housing and including a connecting head at the axial end of the housing,
wherein the connecting head includes at least three liquid ports, each at an end of a respective channel defined by the housing part,
wherein the connecting head is configured for insertion into a cavity of a head part of a liquid treatment system such that the liquid ports of the connecting head are in sealed liquid communication with respective liquid ports in the head part;
a liquid treatment part arranged in the housing, wherein the liquid treatment part comprises at least one component for treating a liquid; and
at least one separate flow conductor part on the inside of the housing, attached to the housing part and including at least one conduit for conducting liquid so as to separate interior ends of at least two of the channels from those of at least one other of the channels,
wherein at least bodies of the housing parts forming the axial ends of the housings of the respective liquid treatment cartridges are essentially identical in shape and dimensions, and
wherein flow conductor parts of at least two of the liquid treatment cartridges separate interior ends of at least four channels differently.

32. The set of liquid treatment cartridges according to claim 31, wherein the at least two liquid treatment cartridges differ in terms of at least one of:
a number of liquid ports arranged to function as inlet ports; and
a number of liquid ports arranged to function as outlet ports.

33. The set of liquid treatment cartridges according to claim 31,
wherein the at least two liquid treatment cartridges further differ in terms of at least one of whether and how many liquid treatment components of each of the following types they include:
a membrane filtration module; and
the liquid treatment part, wherein the liquid treatment part comprises a bed of material for the treatment of liquid by means of a diffusive process and a component including a liquid-permeable porous body of thermally bonded material for the treatment of liquid by means of a diffusive process.

34. The set of liquid treatment cartridges according to claim 31, wherein the separation between interior ends of at least two of the channels and those of at least one other of the channels is such that at least a sub-flow of liquid emerging from an interior end is carried away from the housing part and returns to an interior end separated from the interior end from which it has emerged after passing through the liquid treatment part arranged in the housing.

35. A method of manufacturing at least one of range of liquid treatment cartridges, each including a housing, the housing including a housing part forming an axial end of the housing and including a connecting head at the axial end of the housing,
wherein the connecting head includes at least three liquid ports, each at an end of a respective channel defined by the housing part,
wherein the connecting head is configured for insertion into a cavity of a head part of a liquid treatment system such that the liquid ports of the connecting head are in sealed liquid communication with respective liquid ports in the head part;
a liquid treatment part arranged in the housing, wherein the liquid treatment part comprises at least one component for treating a liquid; and
at least one separate flow conductor part on the inside of the housing, attached to the housing part and including at least one conduit for conducting liquid so as to separate interior ends of at least two of the channels from those at least one other of the channels,
the method including selecting and attaching to the housing part one of a number of different sets of at least one flow conductor part to configure the liquid treatment cartridge.

36. The method according to claim 35,
wherein a next one of the range of liquid treatment cartridges is manufactured to include a housing part of which at least a body is identical in shape and dimensions to that of the housing part of a previous liquid treatment cartridge,
wherein a different one of the sets is selected and attached, such that the interior ends of at least four channels are separated differently in two liquid treatment cartridges.

37. The method according to claim 36, wherein different types of liquid treatment parts are arranged in the housings of the two liquid treatment cartridges.

38. The method according to claim 35, wherein the separation between interior ends of at least two of the channels and those of at least one other of the channels is such that at least a sub-flow of liquid emerging from an interior end is carried away from the housing part and returns to an interior end separated from the interior end from which it has emerged after passing through the liquid treatment part arranged in the housing.

* * * * *